US012574928B2

(12) United States Patent
Gao et al.

(10) Patent No.: US 12,574,928 B2
(45) Date of Patent: Mar. 10, 2026

(54) UPLINK CONTROL INFORMATION TRANSMISSION METHOD AND DEVICE, TERMINAL AND BASE STATION

(71) Applicant: DATANG MOBILE COMMUNICATIONS EQUIPMENT CO., LTD., Beijing (CN)

(72) Inventors: Xuejuan Gao, Beijing (CN); Qianqian Si, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 439 days.

(21) Appl. No.: 17/633,565

(22) PCT Filed: Aug. 5, 2020

(86) PCT No.: PCT/CN2020/107071
§ 371 (c)(1),
(2) Date: Feb. 7, 2022

(87) PCT Pub. No.: WO2021/023218
PCT Pub. Date: Feb. 11, 2021

(65) Prior Publication Data
US 2022/0369347 A1 Nov. 17, 2022

(30) Foreign Application Priority Data

Aug. 8, 2019 (CN) .......................... 201910731339.1

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04W 28/06* (2013.01); *H04W 72/1268* (2013.01); *H04W 72/54* (2023.01)

(58) Field of Classification Search
CPC . H04W 72/21; H04W 28/06; H04W 72/1268; H04W 72/54; H04W 72/0446;
(Continued)

(56) References Cited

U.S. PATENT DOCUMENTS

2018/0167933 A1* 6/2018 Yin ........................ H04L 5/0053
2018/0220413 A1 8/2018 Yang et al.
(Continued)

FOREIGN PATENT DOCUMENTS

| CN | 106067845 A | 11/2016 |
| CN | 106470089 A | 3/2017 |

(Continued)

OTHER PUBLICATIONS

CATT, "Corrections to UCI feedback procedures," 3GPP TSG RAN WGJ Meeting #94 R1-1809713, Aug. 24, 2018 (Aug. 24, 2018) ( Year: 2018).*
(Continued)

*Primary Examiner* — Nicholas A Jensen
*Assistant Examiner* — Oladiran Gideon Olaleye
(74) *Attorney, Agent, or Firm* — Ladas & Parry, LLP

(57) ABSTRACT

An Uplink Control Information UCI transmission method, a UCI transmission device, a terminal, and a base station are provided. The method includes: selecting one of a plurality of first UCIs as a target UCI, when there are a plurality of transmissions of first UCIs, a plurality of Physical Uplink Control Channels PUCCHs respectively carrying the first UCI do not overlap in time domain, and all of the plurality of PUCCHs carrying the first UCI overlap with a PUCCH
(Continued)

10

20 carrying a second UCI in time domain; multiplexing the target UCI and the second UCI.

4 Claims, 8 Drawing Sheets

(51) Int. Cl.
| | | |
|---|---|---|
| *H04W 28/06* | (2009.01) | |
| *H04W 72/1268* | (2023.01) | |
| *H04W 72/54* | (2023.01) | |

(58) Field of Classification Search
CPC .... H04W 72/20; H04L 1/1812; H04L 5/0055; H04L 5/0057; H04L 5/0078; H04L 1/0027; H04L 1/0031; H04L 1/1671; H04L 1/1854; H04L 1/0026; H04L 5/0048; H04L 5/0053; H04L 1/1607
USPC ........................................................ 370/329
See application file for complete search history.

(56) References Cited

U.S. PATENT DOCUMENTS

| | | | | |
|---|---|---|---|---|
| 2018/0270011 | A1 | 9/2018 | Yang et al. | |
| 2018/0324678 | A1* | 11/2018 | Chen ........................ | H04W 8/08 |
| 2019/0208436 | A1* | 7/2019 | Zhou ....................... | H04B 7/088 |
| 2019/0223205 | A1* | 7/2019 | Papasakellariou .... | H04L 5/0057 |
| 2019/0239216 | A1* | 8/2019 | Kundu .................. | H04W 72/21 |
| 2019/0246416 | A1* | 8/2019 | Park ....................... | H04W 72/21 |
| 2020/0367265 | A1 | 11/2020 | Wang et al. | |
| 2021/0337538 | A1 | 10/2021 | Li et al. | |

FOREIGN PATENT DOCUMENTS

| | | | |
|---|---|---|---|
| CN | 109802819 | A | 5/2019 |
| CN | 110034885 | A | 7/2019 |
| CN | 111435867 | A | 7/2020 |
| KR | 20190072507 | A | 6/2019 |
| WO | 20180144470 | A1 | 8/2018 |

OTHER PUBLICATIONS

International Search Report for PCT Application PCT/CN2020/107071 issued on Nov. 3, 2020 and its English Translation provided by WIPO.
Written Opinion for PCT Application PCT/CN2020/107071 issued on Nov. 3, 2020, and its English Translation provided by WIPO.
Internationally Preliminary Report on Patentability for PCT/CN2020/107071 issued on Feb. 8, 2022, and English translation provided by WIPO.
First Office Action for Chinese Patent Application 201910731339.1 issued on Jun. 30, 2021, and its English translation provided by Chinese Patent Office.
Second Office Action for Chinese Patent Application 201910731339.1 issued on Jan. 24, 2022 and its English translation provided by Chinese Patent Office.
Extended European Search Report for European Patent Application 20849353.6 issued on Jul. 15, 2022.
"Remaining issues on PUCCH," 3GPP TSG RAN WG1 #94, R1-1808225, Gothenburg, Sweden, Aug. 21-Aug. 25, 2018, Source: Vivo, Agenda Item: 7.1.3.2.
"Remaining issues PUCCH," 3GPP TSG RAN WG1 Meeting #94, R1-1808260, Gothenburg, Sweden, Aug. 20-Aug. 24, 2018, Agenda Item: 7.1.3.2, Source: MediaTek Inc., all pages.
"Corrections to UCI feedback procedures," 3GPP TSG RAN WG1 Meeting #94, R1-1809713, Gothenburg, Sweden, Aug. 20-24, 2018, Source: CATT, Agenda Item: 7.1.3.2, all pages.
"Enhancements on Multi-TRP/panel transmission" 3GPP TSG RAN WG1 Meeting #96bis, R1-1903970, Xi'an, China, Apr. 8-12, 2019, Agenda Item: 7.2.8.2, Source: Huawei, HiSilicon, all pages.
"Enhancements on Multi-TRP/panel transmission" 3GPP TSG RAN WG1 Meeting #96bis R1-1905523, Xi'an, China, Apr. 8-12, 2019, Agenda Item: 7.2.8.2, Source: Huawei, HiSilicon.
"Enhancements on Multi-TRP/panel transmission" 3GPP TSG RAN WG1 #97 R1-1906029, Agenda Item: 7.2.8.2, Source: Huawei, HiSilicon.

* cited by examiner

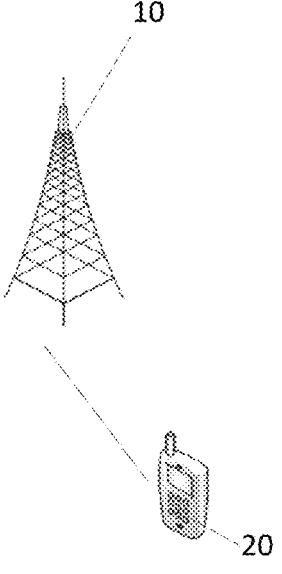

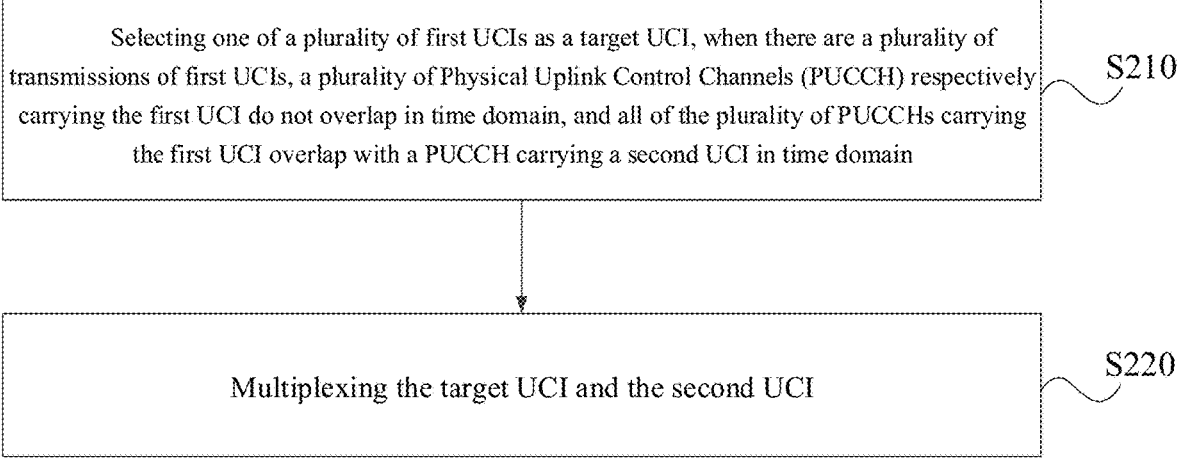

Selecting one of a plurality of first UCIs as a target UCI, when there are a plurality of transmissions of first UCIs, a plurality of Physical Uplink Control Channels (PUCCH) respectively carrying the first UCI do not overlap in time domain, and all of the plurality of PUCCHs carrying the first UCI overlap with a PUCCH carrying a second UCI in time domain

S210

Multiplexing the target UCI and the second UCI

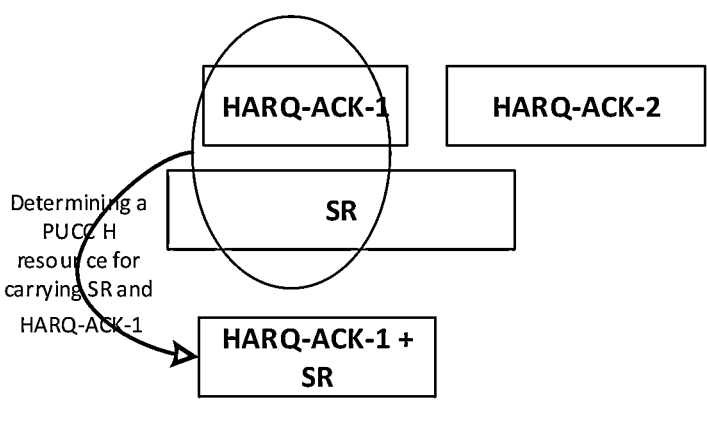
Fig.7b
HARQ-ACK-1          HARQ-ACK-2
SR X
Fig.8a
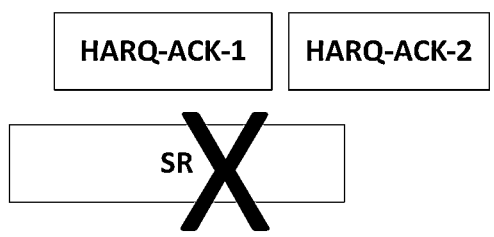
Fig.8b

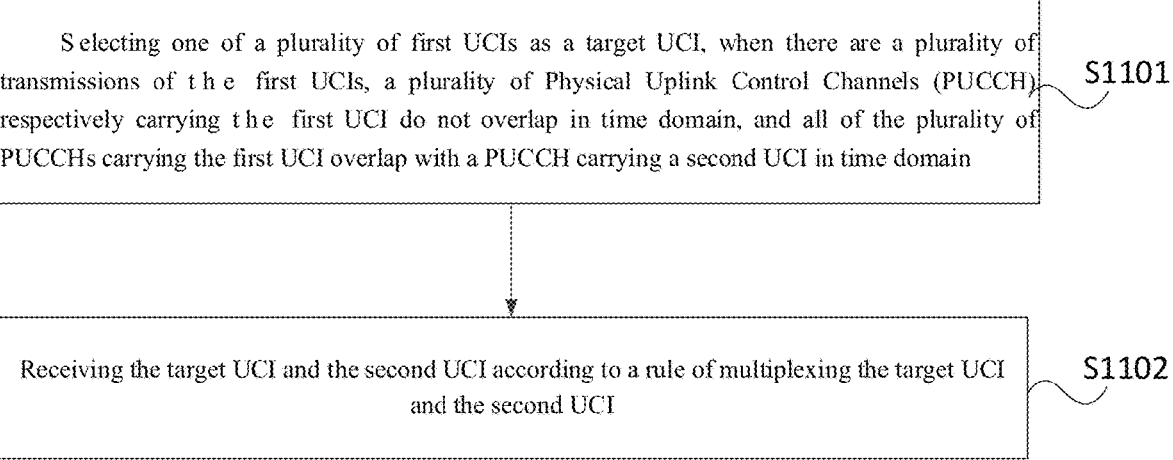

Selecting one of a plurality of first UCIs as a target UCI, when there are a plurality of transmissions of t h e  first UCIs, a plurality of Physical Uplink Control Channels (PUCCH) respectively carrying t h e  first UCI do not overlap in time domain, and all of the plurality of PUCCHs carrying the first UCI overlap with a PUCCH carrying a second UCI in time domain

S1101

Receiving the target UCI and the second UCI according to a rule of multiplexing the target UCI and the second UCI

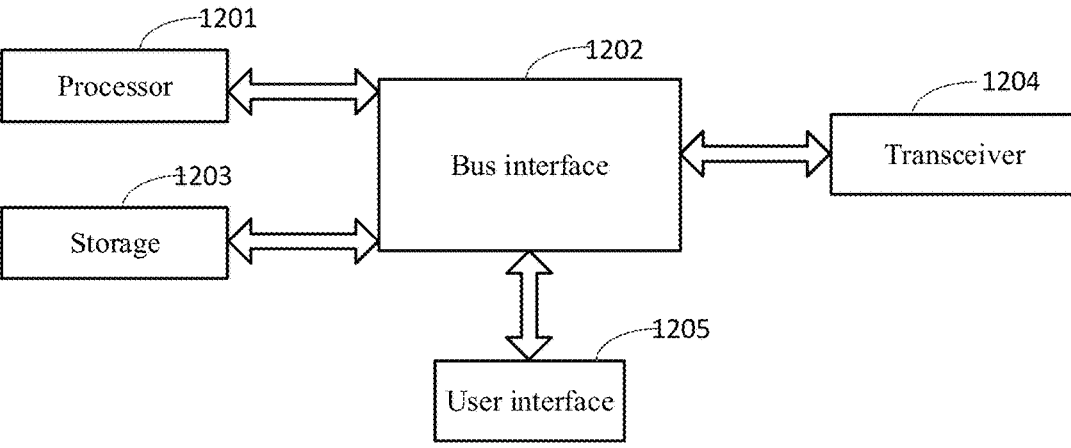

1201 Processor

1202 Bus interface

1204 Transceiver

1203 Storage

1205 User interface

Fig.12

UPLINK CONTROL INFORMATION TRANSMISSION METHOD AND DEVICE, TERMINAL AND BASE STATION

CROS-REFERENCE TO RELATED APPLICATIONS

This application is a U.S. national phase application of a PCT Application No. PCT/CN2020/107071 filed on Aug. 5, 2020, which claims a priority to Chinese Patent application Ser. No. 201910731339.1 filed in China on Aug. 8, 2019, the disclosure of which are incorporated herein by reference in their entireties.

TECHNICAL FIELD

The present disclosure relates to the field of radio technology, in particular, relates to an uplink control information UCI transmission method, an uplink control information UCI transmission device, a terminal and a base station.

BACKGROUND

In Rel-16 of 5G NR, Hybrid Automatic Repeat reQuest Acknowledge (HARQ-ACK) transmission based on sub-slots in one slot can be supported. A plurality of time-division multiplexed Physical Uplink Control Channels (PUCCHs) carrying HARQ-ACKs (in different sub-slots) can be transmitted in one slot.

If adopting the supported manner of transmitting in one slot the plurality of time-division multiplexed PUCCHs carrying the HARQ-ACKs, multiple PUCCHs for carrying the HARQ-ACKs and multiple PUCCHs for carrying Scheduling Requests (SR)/Channel State Information (CSI) may overlap, but only there is only a transmission manner for a case in which a PUCCH resource for one HARQ-ACK and PUCCH resources for CSI/SR overlap. In case that multiple PUCCHs carrying HARQ-ACKs and PUCCH resources for CSI/SR overlap, HARQ-ACKs transmitted in the current Time-division multiplexing (TDM) manner may need to be multiplexed to be transmitted on the same PUCCH, therefore finally affecting a transmission delay and transmission performance of the HARQ-ACKs.

For example, if a PUCCH resource for multiplexing multiple HARQ-ACKs has a longer transmission duration or a later starting position than that of original PUCCH resources originally the multiple HARQ-ACKs, then the transmission delay for the PUCCH resource will be increased as compared to original transmission of the HARQ-ACKs. For example, since the PUCCH resource for multiplexing the multiple HARQ-ACKs carries more Uplink Control Information (UCI), a transmission code rate for the PUCCH resource is higher than that of original PUCCH resources carrying the HARQ-ACKs, which will reduce the transmission performance of the original transmission of the HARQ-ACKs.

Therefore, it is necessary to solve a UCI transmission problem in case that a plurality of PUCCHs carrying HARQ-ACKs and PUCCHs carrying other types of UCI in one slot overlap in time domain.

SUMMARY

An objective of the present disclosure is to provide a method of transmitting Uplink Control Information (UCI), a device of transmitting UCI, a terminal and a base station, which are used to solve a problem that a plurality of first UCIs that are originally transmitted in a time-division multiplexing manner need to be multiplexed on one PUCCH, therefore affecting a transmission delay and a transmission performance of the UCI.

An embodiment of the present disclosure provides a transmission method of Uplink Control Information (UCI). This method is performed by a terminal and includes: selecting one of a plurality of first UCIs as a target UCI, when there are a plurality of transmissions of first UCIs, a plurality of Physical Uplink Control Channels (PUCCH) respectively carrying the first UCI do not overlap in time domain, and all of the plurality of PUCCHs carrying the first UCI overlap with a PUCCH carrying a second UCI in time domain; multiplexing the target UCI and the second UCI.

An embodiment of the present disclosure provides a transmission method of Uplink Control Information (UCI). This method is performed by a base station. The method includes: selecting one of a plurality of first UCIs as a target UCI, when there are a plurality of transmissions of first UCIs, a plurality of Physical Uplink Control Channels (PUCCH) respectively carrying the first UCI do not overlap in time domain, and all of the plurality of PUCCHs carrying the first UCI overlap with a PUCCH carrying a second UCI in time domain; receiving the target UCI and the second UCI according to a rule of multiplexing the target UCI and the second UCI.

An embodiment of the present disclosure also provides a terminal. The terminal includes a transceiver, a storage, a processor and a program stored on the storage and executable on the processor, wherein the processor is configured, when executing the program, for: selecting one of a plurality of first UCIs as a target UCI, when there are a plurality of transmissions of first UCIs, a plurality of Physical Uplink Control Channels (PUCCH) respectively carrying the first UCI do not overlap in time domain, and all of the plurality of PUCCHs carrying the first UCI overlap with a PUCCH carrying a second UCI in time domain; multiplexing the target UCI and the second UCI.

An embodiment of the present disclosure also provides a base station. The base station includes a transceiver, a storage, a processor and a program stored on the storage and executable on the processor, wherein the processor is configured, when executing the program, for: selecting one of a plurality of first UCIs as a target UCI, when there are a plurality of transmissions of first UCIs, a plurality of Physical Uplink Control Channels (PUCCH) respectively carrying the first UCI do not overlap in time domain, and all of the plurality of PUCCHs carrying the first UCI overlap with a PUCCH carrying a second UCI in time domain; receiving the target UCI and the second UCI according to a rule of multiplexing the target UCI and the second UCI.

An embodiment of the present disclosure also provides a transmission device of Uplink Control Information (UCI), applied in a terminal. The transmission device includes a first selection module configured for selecting one of a plurality of first UCIs as a target UCI, when there are a plurality of transmissions of first UCIs, a plurality of Physical Uplink Control Channels (PUCCH) respectively carrying the first UCI do not overlap in time domain, and all of the plurality of PUCCHs carrying the first UCI overlap with a PUCCH carrying a second UCI in time domain; a transmission module configured for multiplexing the target UCI and the second UCI.

An embodiment of the present disclosure also provides a transmission device of Uplink Control Information (UCI), applied in a base station. The transmission device includes a second selection module configured for selecting one of a plurality of first UCIs as a target UCI, when there are a plurality of transmissions of first UCIs, a plurality of Physical Uplink Control Channels (PUCCH) respectively carrying the first UCI do not overlap in time domain, and all of the plurality of PUCCHs carrying the first UCI overlap with a PUCCH carrying a second UCI in time domain; a reception module configured for receiving the target UCI and the second UCI according to a rule of multiplexing the target UCI and the second UCI.

An embodiment of the present disclosure provides a readable storage medium having stored thereon a program, wherein when the program is executed by a processor, the processor implements steps in transmission methods of Uplink Control Information UCI according to any of the above embodiments.

At least one of the above technical solutions of the specific embodiments of the present disclosure has the following beneficial effects.

By adopting the transmission method of uplink control information UCI described in some embodiments of the present disclosure, a first UCI carried on one Physical Uplink Control Channel (PUCCH) of a plurality of PUCCHs carrying first UCIs is selected as a target UCI, when a plurality of PUCCHs, carrying the first UCIs, not overlapping in time domain, overlap with a PUCCH carrying a second UCI in time domain, and the target UCI is multiplexed with the second UCI and the target UCI and the second UCI are transmitted, to avoid a problem that the plurality of PUCCHs, carrying the first UCIs, that are not overlapped in time domain overlap with the PUCCH carrying the second UCI, therefore leading to a consequence that the plurality of first UCIs originally transmitted in a time-division manner need to be multiplexed on one PUCCH and affecting the transmission delay and the transmission performance of the first UCIs.

BRIEF DESCRIPTION OF THE DRAWINGS

FIG. 1 is a schematic diagram of an architecture of a radio communication system to which a transmission method of uplink control information UCI according to the present disclosure is applied;

FIG. 2 is a flowchart of a transmission method according to an embodiment of the present disclosure;

FIG. 7a and FIG. 7b are diagrams of two slot structures for transmissions of a first UCI and a second UCI in a second scenario of a second embodiment according to the transmission method in some embodiments of the present disclosure;

FIGS. 8a and 8b are diagrams of two slot structures for transmissions of a first UCI and a second UCI in a third

Figure 9A:
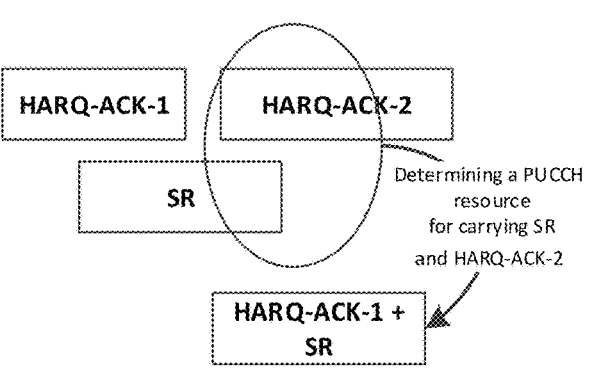
Figure 9B:
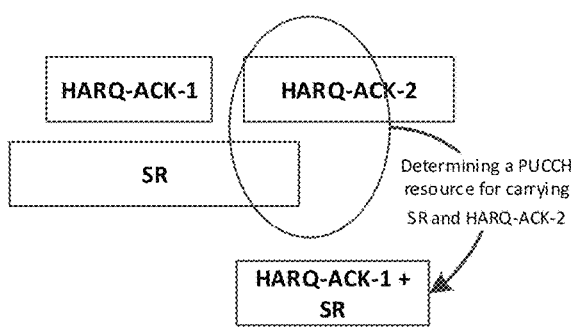
Figure 10A:
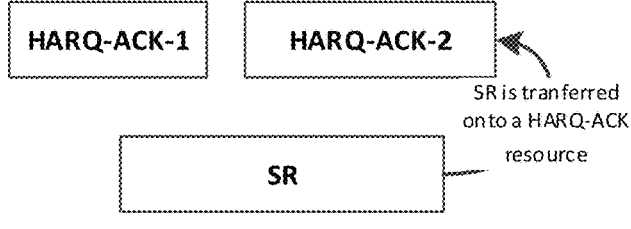
Figure 10B:
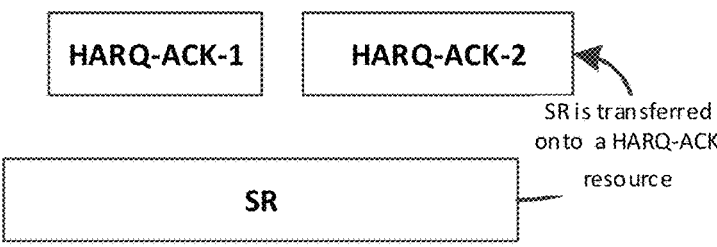
Figure 13:
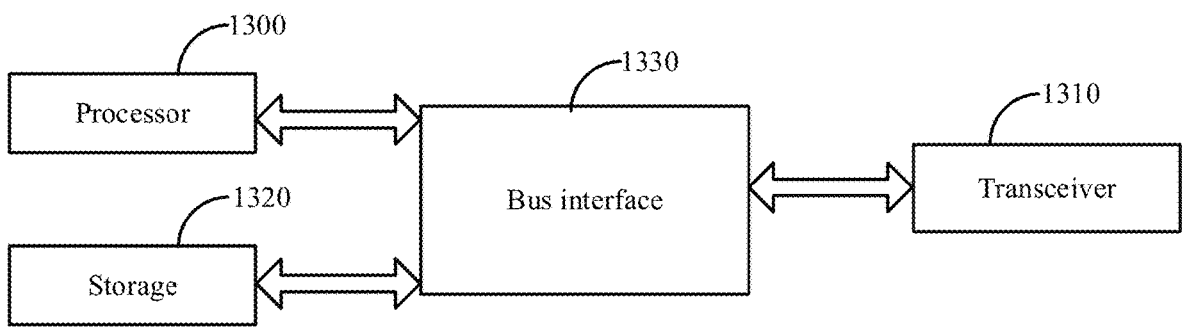
Figure 14:
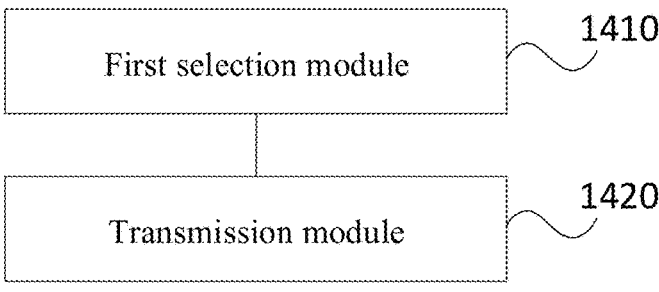
Figure 15:
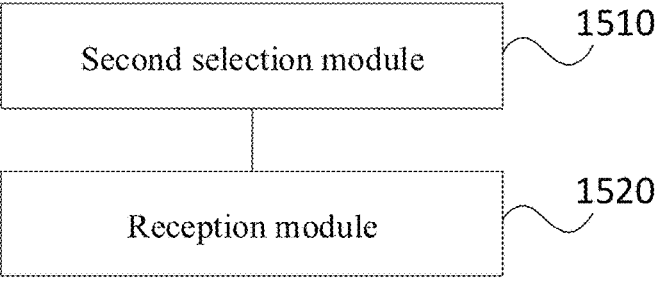

4 scenario of a second embodiment according to the transmission method in some embodiments of the present disclosure;

FIGS. 9a and 9b are diagrams of two slot structures for transmissions of a first UCI and a second UCI in a fourth scenario of a second embodiment according to the transmission method in some embodiments of the present disclosure;

FIGS. 10a and 10b are diagrams of two slot structures for transmissions of a first UCI and a second UCI in a fifth scenario of a second embodiment according to the transmission method in some embodiments of the present disclosure;

FIG. 11 is a flowchart of a transmission method according to another embodiment of the present disclosure;

FIG. 12 is a structural schematic diagram of a terminal according to some embodiments of the present disclosure;

FIG. 13 is a structural schematic diagram of a base station according to some embodiments of the present disclosure;

FIG. 14 is a structural schematic diagram of a transmission device according to an embodiment of the present disclosure, and FIG. 15 is a structural schematic diagram of a transmission device according to another embodiment of the present disclosure.

DETAILED DESCRIPTION

In order to make technical problems to be solved, technical solutions and advantages of the present disclosure more apparent, a detailed description will be given below with reference to drawings and specific embodiments.

The transmission method of uplink control information UCI according to some embodiments of the present disclosure is applied to a radio communication system, which may be a 5G system or an Evolved Long Term Evolution (eLTE) system, or a subsequent evolved communication system.

Referring to FIG. 1, a schematic diagram of an architecture of a radio communication system according to some embodiments of the present disclosure is shown. As shown in FIG. 1, the radio communication system may include a base station and a user equipment (or terminal). For example, the terminal is referred to as a UE 20, and the UE 20 may be connected to a base station 10. In practical application, the connection between the devices may be a radio connection. In order to visually and conveniently show connection relationship between the devices, a solid line is used in FIG. 1.

The base station 10 provided by some embodiments of the present disclosure may be a general base station, or may be an evolved node base station (eNB), or may also be a network-side device (such as a next generation node base station (gNB) or a transmission and reception point (TRP)) or a cell in a 5G system.

The user equipment provided by some embodiments of the present disclosure may be cell phones, tablets, laptops, Ultra-Mobile Personal Computers (UMPC), netbooks or Personal Digital Assistants (PDA) etc.

In addition, it should be noted that a multiplexing transmission rule for multiplexing transmission of the UCI mentioned in some embodiments of the present disclosure may, but is not limited to, include the following several manners 1) to 7).

1) When a PUCCH carrying a SR and a PUCCH carrying a HARQ-ACK overlap in time domain, and the PUCCH carrying the HARQ-ACK uses a PUCCH format 0 (the PUCCH carrying the SR may use the format 0 or a format 1), the SR and the HARQ-ACK are multiplexed on a PUCCH resource of the HARQ-ACK, that is, on the PUCCH resource of the HARQ-ACK, a Cyclic Shift (CS)

corresponding to the HARQ-ACK when a positive SR or a negative SR exists is selected to transmit the HARQ-ACK, which implicitly indicates whether the SR is positive or negative.

2) When the PUCCH carrying the SR and the PUCCH carrying the HARQ-ACK overlap in time domain, and the PUCCH carrying the SR uses the PUCCH format 0 and the PUCCH carrying the HARQ-ACK uses the PUCCH format 1, then the SR is discarded, that is, no multiplexed transmission is performed.

3) When the PUCCH carrying the SR and the PUCCH carrying the HARQ-ACK overlap in time domain, and the PUCCH carrying the SR uses the PUCCH format 1 and the PUCCH carrying the HARQ-ACK uses the PUCCH format 1, then if a positive SR exists, the HARQ-ACK is transmitted on the PUCCH resource of the SR, thus, simultaneous transmission of the SR is implicitly expressed by transmitting the HARQ-ACK by using the PUCCH resource corresponding to the SR; if the SR is a negative SR, the HARQ-ACK is transmitted on the PUCCH resource of the HARQ-ACK.

4) When the PUCCH carrying the SR and the PUCCH carrying the HARQ-ACK overlap in time domain, and the PUCCH carrying the HARQ-ACK uses a PUCCH format 2 or 3 or 4 (the PUCCH carrying the SR may use the format 0 or the format 1), then a PUCCH resource set is determined according to the total number of bits of the SR and the HARQ-ACK, and a PUCCH resource is determined in the determined PUCCH resource set according to a PUCCH resource indication field in Downlink Control Information (DCI) corresponding to the HARQ-ACK, and is used for simultaneous transmission of the SR and the HARQ-ACK, where SR is X bits indicating SR states (which one is positive, or all are negative) among X SRs overlapping with the HARQ-ACK, that is, no matter a SR is positive or negative, X bits of a SR are always transmitted, in order to avoid a change of the number of UCI bits transmitted on the PUCCH resource of the HARQ-ACK due to the SR states.

5) When a PUCCH carrying a Semi-Persistent Scheduling (SPS) HARQ-ACK (that is, a HARQ-ACK corresponding to a SPS PDSCH) and/or SR and a PUCCH carrying CSI overlap in time domain, the SPS HARQ-ACK and/or the SR are transferred onto a PUCCH resource corresponding to the CSI and are transmitted by multiplexing with the CSI.

6) When a PUCCH carrying a HARQ-ACK of a corresponding Physical Downlink Control Channel (PDCCH) and the PUCCH carrying the CSI overlap in time domain, one PUCCH resource set is selected from a plurality of PUCCH resource sets according to the total number of bits of the HARQ-ACK and the CSI, and one PUCCH resource is determined from the selected one PUCCH resource set according to a PUCCH resource indication field in the DCI corresponding to the HARQ-ACK, and is used for simultaneously carrying the HARQ-ACK and the CSI. In this case, the determined PUCCH resource once again may be same as or different from the original PUCCH resource carrying the HARQ-ACK (if different, then a new PUCCH resource is determined). A HARQ-ACK having a corresponding PDCCH is specifically: when the HARQ-ACK is feedback information of a Physical Downlink Shared Channel (PDSCH) scheduled by a PDCCH, the PDCCH corresponds to the HARQ-ACK; when the HARQ-ACK is feedback information of a PDCCH (also referred to as a SPS PDSCH release) indicating a downlink SPS resource release, the PDCCH corresponds to the HARQ-ACK.

7) When a PUCCH carrying the HARQ-ACK having the corresponding PDCCH and carrying the SR overlaps with a PUCCH carrying the CSI in time domain, or when the PUCCH carrying the HARQ-ACK having the corresponding PDCCH overlaps with a PUCCH carrying the CSI and the SR in time domain, or, when the PUCCH carrying the HARQ-ACK having the corresponding PDCCH and carrying the SR and the PUCCH carrying the CSI and the SR overlap in time domain, one PUCCH resource set is selected from a plurality of PUCCH resource sets according to the total number of bits of the HARQ-ACK, the CSI, and the SR, and then one PUCCH resource is determined from the selected one PUCCH resource set according to a PUCCH resource indication field in the DCI corresponding to the HARQ-ACK, and is used for simultaneously carrying the HARQ-ACK, the CSI and the SR. In this case, the determined PUCCH resource once again may be the same as or different from the original PUCCH resource carrying the HARQ-ACK (if different, then a new PUCCH resource is determined).

In addition, when a plurality of PUCCHs exist in one slot and overlapping exists among the PUCCHs, if the PUCCHs in one slot constitute a set Q, then an uplink channel with the earliest start time instant in the set Q is determined as a channel A, a channel set X overlapping with the channel A is determined, a channel resource for multiplexing transmissions is determined for the channel A and a UCI on the channel X according to the above multiplexing transmission rule, and the channel A and the channel X in the set Q are replaced with the channel resource for multiplexing transmissions. The above steps are repeated to determine a channel A and a channel X in a new Q set, until a plurality of time-domain non-overlapping PUCCHs are obtained.

Before multiplexing transmissions, if there is a PUCCH carrying HARQ-ACK in the overlapped PUCCHs, then whether the overlapped PUCCHs satisfy the following timeline condition may be judged first, and the multiplexing transmissions are performed when the timeline condition is satisfied. The timeline condition is to make the terminal decide, before a start time instant of the earliest transmission, how to multiplex, and complete a transmission preparation on an earliest channel according to the decision for this multiplexing. A case in which the terminal does not expect that a scheduling situation that does not satisfy the timeline condition occurs, and if the scheduling situation that does not satisfy the timeline condition occurs, then it is regarded as an erroneous scheduling, that is, scheduling by the base station needs to ensure that the timeline condition is always satisfied; and in another case, the terminal determines whether the multiplexing transmissions can be performed according to a result of judgment for the timeline condition, and the multiplexing transmissions can be performed if the timeline condition is satisfied; if the timeline condition is not satisfied, UCI of a low priority is directly discarded. Of course, the judgment for the timeline condition may not be necessary, that is, it is not excluded that the judgment for the timeline condition is not performed, and it is directly assumed that the transmissions can always be multiplexed.

Timeline1: A time interval between a start symbol of an earliest channel in overlapped channels and an end symbol of any PDSCH of PDSCHs (i.e., a PDSCH for which HARQ-ACK feedback is performed in the PUCCH carrying the HARQ-ACK) corresponding to the HARQ-ACK is not shorter than a time duration T1. That is, the start symbol of the earliest channel in the overlapped channels is not earlier than the time duration T1 after the end symbol of any PDSCH of the PDSCHs corresponding to the HARQ-ACK, wherein T1 is a value predetermined according to configured and agreed parameters.

Timeline2: If a HARQ-ACK has corresponding PDCCHs, then a time interval between a start symbol of an earliest channel in overlapped channels and an end symbol of any PDCCH of PDCCHs corresponding to the HARQ-ACK is not shorter than a time duration T2. That is, the start symbol of the earliest channel in the overlapped channels is not earlier than the time duration T2 after the end symbol of any PDCCH of the PDCCHs corresponding to the HARQ-ACK, wherein T2 is a value predetermined according to configured and agreed parameters.

Specifically, according to the above-mentioned multiplexing transmission rule, when a plurality of PUCCHs, carrying the first UCI, not overlapped in time domain and a PUCCH carrying the second UCI overlap in time domain, and if a starting point of the second UCI is the earliest, then the PUCCH carrying the second UCI is identified as a PUCCH resource A, and the PUCCHs carrying the first UCI are identified as resources X, and a result of multiplexing the plurality of first UCIs with the second UCI is to determine one multiplexing resource, All of the first UCIs and the second UCI are simultaneously transmitted on this resource, thereby causing the plurality of first UCIs to be multiplexed, and affecting a transmission delay and a transmission performance of the first UCIs.

Optionally, when the start point of the second UCI is later than that of a first one of the plurality of first UCIs, the first one of the first UCIs is a PUCCH resource A and the second UCI is the resource X according to the above-mentioned multiplexing transmission rule, then the first one of the first UCIs needs to be multiplexed with the second UCI. In a specific case, for example, the first one of the first UCIs uses a PUCCH format 1, and the second UCI is the SR and uses the PUCCH format 0, the second UCI being the SR will be discarded.

By adopting the transmission method of uplink control information UCI described in some embodiments of the present disclosure, it is possible to solve the problem that a plurality of PUCCHs, carrying the first UCIs, not overlapped in time domain and a PUCCH carrying the second UCI overlap in time domain, which leads to a consequence that a plurality of first UCIs originally transmitted in a time-division multiplexing manner needs to be multiplexed on one PUCCH, thereby affecting the transmission delay and the transmission performance of the first UCIs; and a problem that the second UCI will be discarded in the above specific situation may also be addressed.

Specifically, as shown in FIG. 2, the transmission method of uplink control information UCI according to an embodiment of the present disclosure is applied to a terminal, wherein the method includes steps S210-S220.

S210: selecting one of a plurality of first UCIs as a target UCI, when there are multiple transmissions of the plurality of first UCIs, a plurality of Physical Uplink Control Channels (PUCCH) respectively carrying the first UCI do not overlap in time domain, and the plurality of PUCCHs carrying the first UCIs all overlap with a PUCCH carrying a second UCI in time domain;

S220: multiplexing the target UCI and the second UCI.

By adopting the transmission method of uplink control information UCI described in some embodiments of the present disclosure, a first UCI carried on one Physical Uplink Control Channel (PUCCH) of a plurality of PUCCHs carrying first UCIs is selected as a target UCI, when a plurality of PUCCHs, carrying the first UCIs, not overlapping in time domain, overlap with a PUCCH carrying a second UCI in time domain, and the target UCI is multiplexed with the second UCI and the target UCI and the second UCI are transmitted, to avoid a problem that the plurality of PUCCHs, carrying the first UCIs, that are not overlapped in time domain overlap with the PUCCH carrying the second UCI, therefore leading to a consequence that the plurality of first UCIs originally transmitted in a time-division manner need to be multiplexed on one PUCCH and affecting the transmission delay and the transmission performance of the first UCIs.

In addition, it should be noted that, according to the transmission method of the uplink control information UCI described in some embodiments of the present disclosure, since the target UCI of the plurality of first UCIs can be selected to be multiplexed with the second UCI for transmission, it is also possible to avoid the problem that the second UCI may be discarded in certain cases using a conventional multiplexing transmission rule.

In some embodiments of the present disclosure, optionally, the first UCIs include Hybrid Automatic Repeat reQuest Acknowledge (HARQ-ACK), that is, only HARQ-ACK, or HARQ-ACK+SR, or the like.

The second UCI includes at least one of channel state information (CSI), a scheduling request (SR), and HARQ-ACK.

In addition, optionally, when the second UCI includes the HARQ-ACK, service types corresponding to the first UCI and the second UCI are different or priority levels of services corresponding to the first UCI and the second UCI are different, or priority levels of the first UCI and the second UCI are different; and/or, when the second UCI includes at least one of the CSI and the SR, service types corresponding to the first UCI and the second UCI are same or different, or priority levels of service types corresponding to the first UCI and the second UCI are same or different, or priority levels of the first UCI and the second UCI are same or different.

For example, when the second UCI is the HARQ-ACK, service types corresponding to the first UCI and the second UCI are different, such as, the first UCI belongs to a URLLC service and the second UCI belongs to an eMBB service; or the first UCI corresponds to a first priority level, and the second UCI corresponds to a second priority level, wherein the first priority level is higher than the second priority level.

In particular, when the transmission method of the uplink control information UCI according to some embodiments of the present disclosure can be applied to multiple HARQ-ACK transmissions, UCI transmission is performed when a plurality of PUCCHs respectively carrying HARQ-ACKs and a PUCCH carrying another type of UCI overlap in time domain. Thus, when the above overlapping occurs, multiple HARQ-ACKs originally transmitted in a time-division multiplexing manner need to be multiplexed on the same PUCCH, thus affecting the transmission delay and the transmission performance of the HARQ-ACKs.

Optionally, in some embodiments of the present disclosure, in step S210, the mentioned plurality of PUCCHs respectively carrying the first UCIs are transmitted in different sub-slots. The sub-slot is a time unit having a fixed number of symbols in agreed or configured one slot, An order of sub-slots in a slot, a position of each sub-slot, and the number of symbols included in the sub-slot are pre-agreed or configured, and different sub-slots in one slot contain the same or different number of symbols. That is to say, in each sub-slot included in the same slot, the number of symbols included in each sub-slot may be the same, for example, 7 symbols or 2 symbols. Of course, the number of symbols included in each sub-slot may also be different, for example, the first sub-slot includes 4 symbols, the second sub-slot includes 3 symbols, but the specific number of symbols in each sub-slot may be determined by pre-agreement or configuration.

For example, a plurality of PUCCHs respectively carrying the first UCIs may be transmitted in different sub-slots in the same slot, or may be transmitted in different sub-slots in different slots.

In some embodiments of the present disclosure, in step S210, one of the plurality of first UCIs is selected as a target UCI according to one of the following first and second manners.

The first manner: selecting a first UCI, with an earliest start symbol, among the plurality of first UCIs as the target UCI.

The second manner: selecting a first UCI using a first PUCCH format among the plurality of first UCIs as the target UCI.

A specific embodiment of selecting one of a plurality of first UCIs as a target UCI by using each of the above first and second manners and multiplexing the target UCI with the second UCI and transmitting the target UCI and the second UCI that are multiplexed will be described in detail below.

The first manner: selecting the first UCI, with the earliest start symbol, among the plurality of first UCIs as the target UCI, that is, specifically, always selecting the first one of the plurality of first UCIs as the target UCI, multiplexing the second UCI with the target UCI, and transmitting the second UCI and the target UCI that are multiplexed.

Specifically, a manner of multiplexing the second UCI and the target UCI may be obtained by referring to the above-mentioned several multiplexing and transmission rules for multiplexing UCIs, that is, according to a type combination of the second UCI and the target UCI and different combinations of PUCCH formats, a final transmission channel and transmission content are determined.

In addition, when the first UCI with the earliest start symbol among the plurality of first UCIs is selected as the target UCI according to the first manner, before multiplexing the target UCI and the second UCI, the method further includes: determining whether a PUCCH carrying the target UCI and a PUCCH carrying the second UCI satisfy a predetermined time condition; if the predetermined time condition is satisfied, multiplexing the target UCI and the second UCI; if the predetermined time condition is not satisfied, considering an erroneous scheduling or discarding the second UCI.

In the above manner, it is not necessary to judge whether the predetermined time condition is satisfied between all the first UCIs and the second UCI, but only needs to judge the predetermined time condition between the selected target UCI and the second UCI.

It should be noted that the predetermined time conditions mentioned in some embodiments of the present disclosure include Timeline1 and/or Timeline2 described above and will not be described in detail herein.

When selecting the first UCI with the earliest start symbol among the plurality of first UCIs as the target UCI, and when a preset condition is satisfied, multiplexing the target UCI and the second UCI includes: discarding the second UCI, or multiplexing the second UCI and the target UCI on a PUCCH corresponding to the second UCI; wherein the preset condition is at least one of the following: a condition that the second UCI at least includes the CSI, and the target UCI does not have a corresponding Physical Downlink Control Channel (PDCCH) or corresponding Downlink Control Information (DCI); a condition that the number of bits of the second UCI is greater than a preset bit quantity, and the target UCI does not have a corresponding PDCCH; a condition that the second UCI is an SR, and the target UCI does not have a corresponding PDCCH; a condition that the second UCI is an HARQ-ACK having a bit quantity less than or equal to a preset bit quantity, and the target UCI does not have a corresponding PDCCH; a condition that the second UCI is the SR, and the PUCCH format 1 is used for transmission of the target UCI; a condition that the second UCI is an HARQ-ACK having a bit quantity less than or equal to a preset bit quantity, and a PUCCH format 1 is used for transmission of the target UCI.

The preset bit quantity is a predefined or configured bit threshold, optionally, the preset bit quantity is 1 bit or 2 bits.

It should be noted that, a person skilled in the art should be able to understand a method of judging whether the target UCI has a corresponding PDCCH, for example, when the target UCI is a HARQ-ACK, the HARQ-ACK with the corresponding PDCCH can be interpreted as: when the HARQ-ACK is a HARQ-ACK for a Physical Downlink Shared Channel (PDSCH) scheduled by a PDCCH, the PDCCH scheduling the PDSCH is a PDCCH corresponding to the HARQ-ACK; when the HARQ-ACK is a HARQ-ACK corresponding to a PDCCH indicating a downlink SPS resource release, the PDCCH itself is a PDCCH corresponding to HARQ-ACK. A specific manner of determining whether the target UCI has a corresponding PDCCH will not be described in detail herein.

According to the above, when the first one of the plurality of first UCIs is always selected as the target UCI in the above first manner: 1) when the second UCI at least includes the CSI or a bit quantity of the second UCI is larger than a preset bit quantity, and if the target UCI does not have a corresponding PDCCH, then the second UCI and the target first UCI are multiplexed; specifically, this case includes discarding the second UCI, or multiplexing the second UCI and the target first UCI on the PUCCH resource corresponding to the second UCI; 2) when the second UCI is an SR or the second UCI is an HARQ-ACK which has a bit quantity not exceeding a preset bit quantity, and if the target UCI does not have a corresponding PDCCH or the target UCI uses the PUCCH format 1, then the second UCI and the target UCI are multiplexed; specifically, this case includes discarding the second UCI, or multiplexing the second UCI and the target UCI on the PUCCH resource corresponding to the second UCI.

The second manner: selecting, among the plurality of first UCIs, a first UCI having a first PUCCH format as the target UCI, and multiplexing the target UCI and the second UCI.

Optionally, by adopting the second manner, when selecting, among the plurality of first UCIs, the first UCI having the first PUCCH format as the target UCI, before selecting one of the plurality of first UCIs as the target UCI, the method further includes: determining whether a predetermined time condition is satisfied between the plurality of PUCCHs carrying the first UCIs and the PUCCH carrying the second UCI; selecting a first UCI having a first PUCCH format as the target UCI if the predetermined time condition is satisfied; if the predetermined time condition is not satisfied, determining that scheduling is erroneous, or discarding the second UCI.

According to the second manner, judgement on the above predetermined time condition needs to be made between all PUCCHs carrying first UCIs overlapped with the second UCI and the PUCCH of the second UCI, whether the first UCI for which the judgement on the above predetermined time condition is made is determined as the target UCI or not.

In some embodiments of the present disclosure, optionally, when the target UCI is determined by using the second manner, in step S210, selecting, among the plurality of first UCIs, the first UCI having the first PUCCH format as the target UCI includes: when there are at least two first UCIs having the first PUCCH format, selecting, among the first UCIs having the first PUCCH format, a first UCI having an earliest start symbol as the target UCI.

Optionally, when the target UCI is determined by using the second manner, in step S210, selecting, among the plurality of first UCIs, the first UCI having the first PUCCH format as the target UCI includes: when there is no first UCI using the first PUCCH format, selecting the target UCI according to one of the following, or discarding the second UCI: 1) selecting a first UCI with an earliest start symbol, among the plurality of first UCIs as the target UCI; 2) selecting a first UCI having a corresponding PDCCH among the plurality of first UCIs as the target UCI; 3) selecting the first UCI with a second PUCCH format among the plurality of first UCIs as the target UCI; wherein when the first PUCCH format is a PUCCH format 0, the second PUCCH format includes at least one of a PUCCH format 2, a PUCCH format 3, and a PUCCH format 4; when the first PUCCH format is at least one of the PUCCH format 2, the PUCCH format 3, and the PUCCH format 4, the second PUCCH format is the PUCCH format 0.

Optionally, selecting the first UCI having the second PUCCH format among the plurality of first UCIs as the target UCI includes at least one of the following: 1) when there are at least two first UCIs using the second PUCCH format, selecting, among first UCIs using the second PUCCH format, a first UCI with the earliest start symbol as the target UCI; 2) when there is no first UCI using the second PUCCH format, selecting the first UCI with the earliest start symbol among the plurality of first UCIs as the target UCI, or selecting, among the plurality of first UCIs, a first UCI having a corresponding PDCCH as the target UCI, or discarding the second UCI.

In addition, optionally, selecting, among the plurality of first UCIs, a first UCI having a corresponding PDCCH as the target UCI includes at least one of the following: 1) when there are at least two first UCIs having corresponding PDCCHs, selecting, among the first UCIs having the corresponding PDCCHs, the first UCI having the earliest start symbol as the target UCI; 2) when there is no first UCI with a corresponding PDCCH, selecting, among the plurality of first UCIs, the first UCI with the earliest start symbol as the target UCI (in this case, the specific method of multiplexing the first UCI and the target UCI is the same as the above); or discarding the second UCI.

According to the above, when the first UCI using the first PUCCH format among the plurality of first UCIs is selected as the target UCI by using the above second manner, if the first UCI using the first PUCCH format does not exist in the plurality of first UCIs, then any one of the following methods 1)-4) can be selected for processing: 1) discarding the second UCI, that is, independently transmitting the first UCIs on respective PUCCH resources of the plurality of first UCIs; 2) selecting, among the plurality of first UCIs, the first UCI with the earliest start symbol as the target UCI (in this case, a specific manner of multiplexing the first UCI and the target UCI is the same as above, and is not described in detail); 3) selecting a first UCI having a corresponding PDCCH among the plurality of first UCIs as a target UCI;

wherein, when there are a plurality of first UCIs having corresponding PDCCHs, the first UCI having the earliest start symbol among the first UCIs having corresponding PDCCHs is selected as the target UCI; when there is no first UCI with a corresponding PDCCH among the plurality of first UCIs, the first UCI with the earliest start symbol among the plurality of first UCIs is selected as the target UCI (in this case, the specific manner of multiplexing the first UCI and the target UCI is the same as above, which is not described in detail), or the second UCI is discarded; 4) selecting, as the target UCI, the first UCI using a second PUCCH format among the plurality of first UCIs; when there are a plurality of first UCIs using the second PUCCH format, selecting, as the target UCI, one first UCI having the earliest start symbol among the first UCIs using the second PUCCH format; when the first UCI using the second PUCCH format does not exist in the plurality of first UCIs, the first UCI having the earliest start symbol among the plurality of first UCIs is selected as the target UCI (in this case, the specific manner for multiplexing of the first UCI and the target UCI is the same as above and is not described in detail); or, selecting a first UCI with a corresponding PDCCH among the plurality of first UCIs as a target UCI (specifically, if there is no first UCI with a corresponding PDCCH, an implementation of the same is same as above, and the description is omitted), or discarding the second UCI.

It should be noted that, according to the second manner, when the first UCI using the first PUCCH format is selected from the plurality of first UCIs as the target UCI, the first PUCCH format includes at least one of the PUCCH format 2, the PUCCH format 3, and the PUCCH format 4, or, when the second UCI at least includes the CSI, or when the second UCI at least includes the HARQ-ACK, or when the quantity of bits of the second UCI is greater than a preset bit quantity, the first PUCCH format includes at least one of the PUCCH format 2, the PUCCH format 3, and the PUCCH format 4; or, when the second UCI is the SR, or when the quantity of bits of the second UCI is less than or equal to the preset bit quantity, the first PUCCH format includes at least one of the PUCCH format 0, the PUCCH format 2, the PUCCH format 3, and the PUCCH format 4; or, when the second UCI is HARQ-ACK and the quantity of bits of the second UCI is greater than the preset bit quantity, the first PUCCH format includes at least one of the PUCCH format 2, the PUCCH format 3 and the PUCCH format 4; or, when the second UCI is the HARQ-ACK, and the quantity of bits of the second UCI is less than or equal to the preset bit quantity, the first PUCCH format includes at least one of the PUCCH format 0, the PUCCH format 2, the PUCCH format 3, and the PUCCH format 4.

Optionally, the preset bit quantity is predefined or pre-configured, for example, may be 1 bit or 2 bits; of course, other preset bit quantity greater than 2 is not excluded.

Specifically, when the first PUCCH format includes at least one of the PUCCH format 2, the PUCCH format 3 and the PUCCH format 4, the determined first PUCCH format may be applicable to a case where the second UCI is any UCI, of course, may also be applicable to a case where the second UCI is a certain specific UCI. For example, when the second UCI includes the CSI, the first UCI using at least one of the PUCCH format 2, the PUCCH format 3 and the PUCCH format 4 is selected as the target UCI from the plurality of first UCI, because resources of the PUCCH formats are relatively large, and multiplexing and transmission of the first UCI and the second UCI can always be supported, and because the first UCI originally uses a resource of at least one of the PUCCH format 2, the PUCCH format 3 and the PUCCH format 4. In case where resources of the PUCCH formats 2, 3, and 4 have the same code rate, even if the PUCCH resource determined according to the total quantity of bits of the first UCI and the second UCI is different from the PUCCH resource originally carrying the first UCI, this does not affect a transmission reliability of the first UCI.

A manner of determining a first PUCCH format as the PUCCH format 0 and/or PUCCH formats 2, 3, and 4 when the second UCI is the SR or when the quantity of bits of the second UCI is less than or equal to the preset bit quantity is applicable to the case where the second UCI is the SR or is the HARQ-ACK that does not exceed a preset bit quantity. An advantage of this manner is that, according to a multiplexing rule, the target UCI can be transmitted by selecting to use different cyclic shifts on the PUCCH resource of the target UCI, to implicitly express a state of the second UCI. For example, when the second UCI is the SR and if the SR is a positive SR, then the HARQ-ACK is transmitted using a predefined set of cyclic shifts for transmitting HARQ-ACKs using PUCCH format 0 in the presence of a positive SR; if the base station detects a HARQ-ACK through cyclic shifts in this set of cyclic shifts, the it is considered that the positive SR exists at the same time, so that a transmission resource of the original target UCI does not need to be changed, and the transmission delay of the original target UCI is not affected due to multiplexed transmission.

It should be noted that, in the detailed description of the above embodiment, in each case of discarding the second UCI, for the plurality of first UCIs, the step of transmitting corresponding first UCIs on respective PUCCHs of the plurality of first UCIs is performed.

In the transmission method of uplink control information UCI according to some embodiments of the present disclosure, in step S220, multiplexing the target UCI and the second UCI, includes: determining a target PUCCH for transmitting the target UCI and the second UCI simultaneously; performing multiplexed transmission of the target UCI and the second UCI on the target PUCCH; wherein the target PUCCH does not overlap in time domain with any one PUCCH carrying a first UCI, other than the target UCI, of the plurality of first UCIs, or the target PUCCH and the PUCCH carrying the target UCI are in the same sub-slot.

It should be noted that, when the target UCI and the second UCI are respectively of different types or correspond to different PUCCH formats, a specific mode of performing the multiplexed transmission may be obtained by referring to the above-mentioned multiplexing transmission rule, which will not be described in detail herein.

By adopting the transmission method of uplink control information UCI described in some embodiments of the present disclosure, when a plurality of Physical Uplink Control Channel (PUCCHs), carrying the first UCI, not overlapped in time domain and a PUCCH carrying a second UCI, multiplexed transmission of the second UCI with a target UCI of the plurality of first UCI is performed, so as to avoid a problem that since the plurality of PUCCHs, carrying the first UCI, not overlapped in time domain and the PUCCH carrying the second UCI overlap in time domain, a plurality of first UCIs that are originally transmitted in a time-division multiplexing manner need to be multiplexed on one PUCCH, thereby affecting the transmission delay and the transmission performance of the first UCI.

The UCI transmission method according to some embodiments of the present disclosure will be described in detail below in conjunction with specific embodiments.

First Embodiment

It is assumed that two PUCCHs carrying HARQ-ACKs and one PUCCH carrying a CSI overlap, that is, the first UCI is a HARQ-ACK, and the second UCI is the CSI.

The first manner: always selecting a first HARQ-ACK (i.e., the HARQ-ACK with the earliest start symbol) among the plurality of HARQ-ACKs as the target HARQ-ACK, and multiplexing the CSI and the first HARQ-ACK; in this manner, it is unnecessary to consider the PUCCH format used by the second HARQ-ACK and whether the second HARQ-ACK is a dynamic HARQ-ACK (i.e. a HARQ-ACK with a corresponding PDCCH) or a Semi-Persistent Scheduling (SPS) HARQ-ACK (i.e. HARQ-ACK for a SPS PDSCH), that is, for cases that the second HARQ-ACK uses any PUCCH format or whether the second HARQ-ACK corresponds to a PDCCH, it can be processed in this way.

Figure 3A:
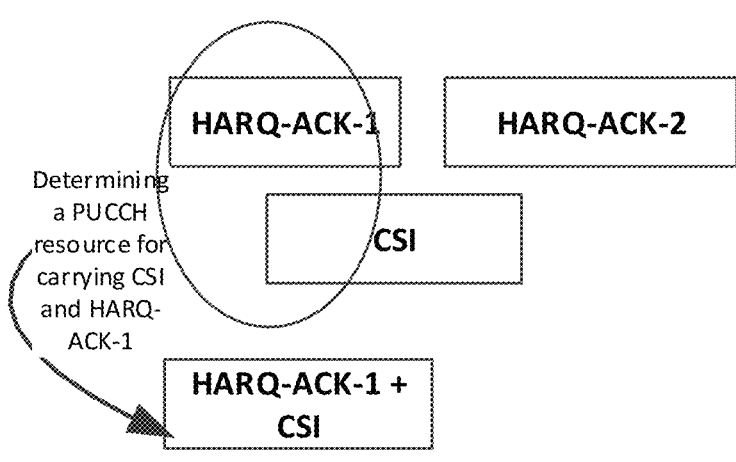
FIG. 3a and FIG. 3b are diagrams of two slot structures for transmissions of a first UCI and a second UCI in a first scenario of a first embodiment according to the transmission method in some embodiments of the present disclosure.
Figure 3B:
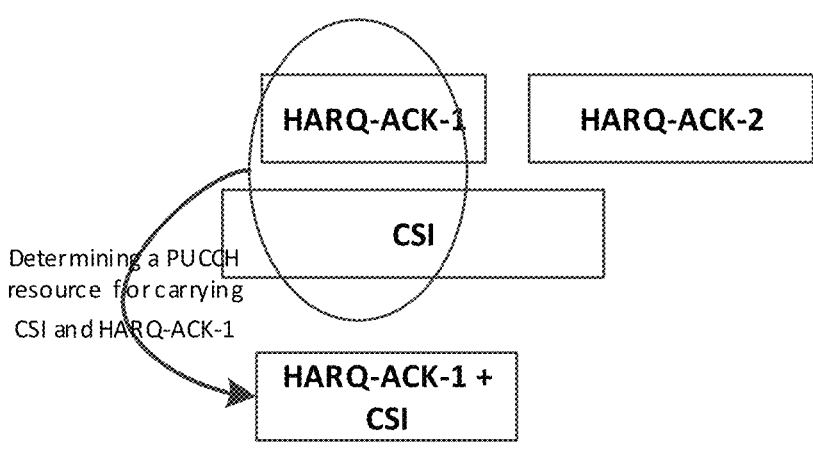

When the first HARQ-ACK is the HARQ-ACK with the corresponding PDCCH (that is, the first HARQ-ACK is a HARQ-ACK of a PDSCH scheduled by the PDCCH, or is a HARQ-ACK of a PDCCH indicating a downlink SPS resource release, which may be simply referred to as the dynamic HARQ-ACK), then according to the above multiplexing transmission rule, multiplexing the CSI and the first HARQ-ACK specifically includes: selecting one of a plurality of pre-configured PUCCH resource sets according to the total bit quantity of the first HARQ-ACK and the CSI, and according to a PUCCH resource indication field in the PDCCH corresponding to the first HARQ-ACK, determining one PUCCH resource in the determined one PUCCH resource set, and simultaneously transmitting the first HARQ-ACK and the CSI on the determined one PUCCH resource, wherein the determined one PUCCH resource does not cross a sub-slot boundary, that is, in the same subframe slot as the first HARQ-ACK (HARQ-ACK-1), then there is no overlap with the second HARQ-ACK (HARQ-ACK-2), and the second HARQ-ACK is no longer overlapped with the CSI, and thus separate transmission is possible, as shown in FIG. 3a and FIG. 3b. That is, in this case, regardless of the PUCCH format used for the first HARQ-ACK, as long as there is a corresponding PDCCH, it is considered that one resource can always be determined according to the total bit quantity and the resource indication field to simultaneously transmit the HARQ-ACK and the CSI.

Figure 4A:
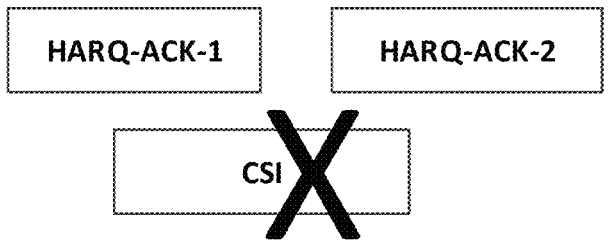
FIG. 4a and FIG. 4b are diagrams of two slot structures for transmissions of a first UCI and a second UCI in a second scenario of a first embodiment according to the transmission method in some embodiments of the present disclosure.
Figure 4B:
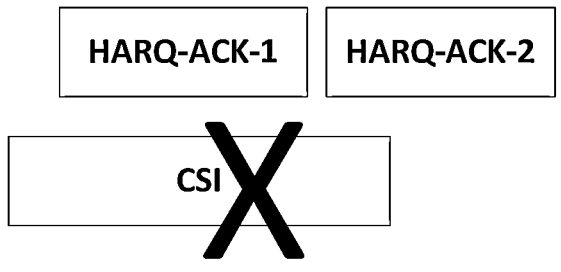

When the first HARQ-ACK does not have a corresponding PDCCH (that is, the first HARQ-ACK is the HARQ-ACK of the SPS PDSCH, which may be referred to as a SPS HARQ-ACK), since the PUCCH resource indication field cannot be obtained, a resource in the PUCCH resource set cannot be determined, and the SPS HARQ-ACK itself uses a resource of the PUCCH format 0 or 1 and cannot carry a CSI bit, then in this case, dropping CSI can be determined, and the HARQ-ACKs are transmitted respectively on the PUCCH resources corresponding to the two HARQ-ACKs, as shown in FIG. 4a and FIG. 4b.

In particular, before performing the above operation, it may be firstly judged whether the PUCCH carrying the first HARQ-ACK and the PUCCH carrying the CSI satisfy the preset time condition (timeline), that is, when the first HARQ-ACK is an HARQ-ACK with a corresponding PDCCH, it is judged whether the start symbol of the earliest one of the two PUCCHs satisfies following conditions: after a time duration T1 after the end symbol of the PDSCH corresponding to the first HARQ-ACK, and after a time duration T2 after the end symbol of the PDCCH corresponding to the first HARQ-ACK. If the first HARQ-ACK does not have a corresponding PDCCH, then it is judged whether the start symbol of the earliest one of the two PUCCHs satisfies a following condition: after a time duration T1 after the end symbol of the PDSCH corresponding to the first HARQ-ACK; if the start symbol satisfies this condition, then the above operation of multiplexing and transmission is performed; or if the start symbol does not satisfy this condition, it is determined as an erroneous scheduling or the CSI is dropped directly. Of course, the judgement on the timeline is not forced to be performed, it may also stipulated that the judgement on the timeline is unnecessary, then it may be considered that as long as support to simultaneous transmission of the HARQ-ACK and the CSI may be configured, the multiplexing and transmission may be directly performed.

The second manner: selecting, as the target HARQ-ACK, a HARQ-ACK using the PUCCH format 2, 3 or 4 among the plurality of HARQ-ACKs, and multiplexing the CSI and the target HARQ-ACK, that is, the first PUCCH format is the PUCCH format 2, 3 or 4 in this case.

Figure 5A:
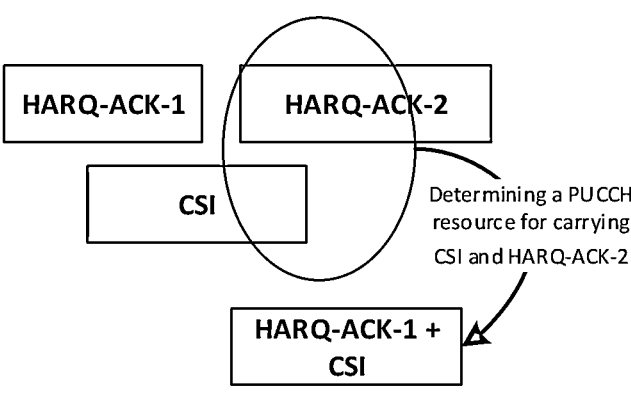
FIG. 5a and FIG. 5b are diagrams of two slot structures for transmissions of a first UCI and a second UCI in a third scenario of a first embodiment according to the transmission method in some embodiments of the present disclosure.
Figure 5B:
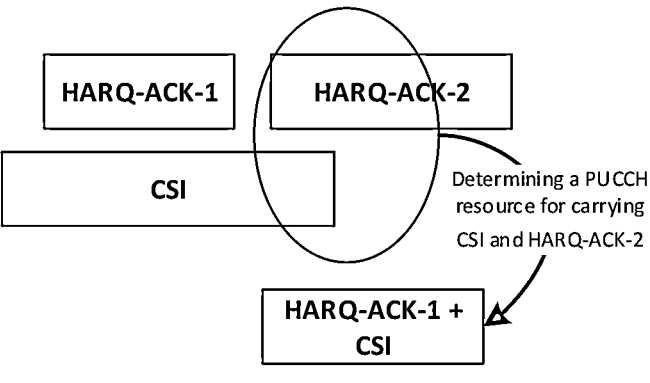

Specifically, it is assumed that the first HARQ-ACK uses PUCCH format 0 and the second HARQ-ACK PUCCH uses PUCCH format 2, the target HARQ-ACK is determined as the second HARQ-ACK, and multiplexing the CSI and the second HARQ-ACK according to the above multiplexing transmission rule specifically includes selecting one from a plurality of pre-configured PUCCH resource sets according to the total bit quantity of the second HARQ-ACK and the CSI, determining one PUCCH resource in the determined one PUCCH resource set according to the PUCCH resource indication field in the PDCCH corresponding to the second HARQ-ACK, and simultaneously transmitting the second HARQ-ACK and the CSI on the determined one PUCCH resource, wherein the determined one PUCCH resource does not cross a sub-slot boundary, that is, in the same slot of a subframe as the second HARQ-ACK, then would not overlap with the first HARQ-ACK, and the first HARQ-ACK is no longer overlapped with the CSI, and can be transmitted separately, as shown in FIG. 5a and FIG. 5b.

It is assumed that each of the first HARQ-ACK and the second HARQ-ACK is transmitted using one of PUCCH formats 2, 3 and 4 (formats used by the first HARQ-ACK and the second HARQ-ACK may be the same or different, as long as the formats all belong to a set including the PUCCH formats 2, 3 and 4), then it is determined according to an order of transmission time that the target HARQ-ACK is the first HARQ-ACK, and the CSI and the first HARQ-ACK are multiplexed according to the above multiplexing transmission rule. A specific process thereof is the same as a corresponding process in the above first manner, as shown in FIG. 3a and FIG. 3b.

It is assumed that neither of the two HARQ-ACKs is transmitted using a format of the PUCCH formats 2, 3 or 4, for example, the first HARQ-ACK uses the PUCCH format 1 and the second HARQ-ACK uses the PUCCH format 0, then any of the following may be adopted: 1) drop CSI, i.e., HARQ-ACKs are independently transmitted on PUCCH resources of the HARQ-ACKs, respectively, as shown in FIG. 4a and FIG. 4b; 2) the first HARQ-ACK of the plurality of HARQ-ACKs is selected as the target first UCI, and the specific process thereof is the same as a related process in the first manner, and whether multiplexed transmission (as shown in FIG. 3a and FIG. 3b) or dropping CSI (as shown in FIG. 4a and FIG. 4b) needs to be determined according to whether the HARQ-ACK has a corresponding PDCCH, the specific manner thereof is not repeated; 3) selecting an HARQ-ACK having a corresponding PDCCH among the plurality of HARQ-ACKs as a target HARQ- ACK; for example, only the first HARQ-ACK is an HARQ-ACK with a corresponding PDCCH, then the first HARQ-ACK is determined as the target HARQ-ACK, and the CSI and the first HARQ-ACK are multiplexed according to the above multiplexing transmission rule, and the specific process thereof is the same as the related process in the first manner, as shown in FIG. 3a and FIG. 3b, detailed description thereof is omitted. As another example, the two HARQ-ACKs are both HARQ-ACKs with corresponding PDCCHs, then the first HARQ-ACK is determined as the target HARQ-ACK according to an order of time, and the CSI and the first HARQ-ACK are multiplexed according to the above multiplexing transmission rule, and a specific process thereof is the same as the related process in the first manner, as shown in FIG. 3a and FIG. 3b, a detailed description is not repeated. As still another example, if neither of the two HARQ-ACKs has a corresponding PDCCH, then the CSI is dropped, and HARQ-ACKs are transmitted on respective PUCCH resources of the HARQ-ACKs, as shown in FIG. 4a and FIG. 4b.

In particular, before performing the above operation, it may be firstly judged whether the PUCCH carrying the first HARQ-ACK, the PUCCH carrying the second HARQ-ACK, and the PUCCH carrying the CSI satisfy the predetermined time condition timeline. That is, when there is a HARQ-ACK having a corresponding PDCCH in the two HARQ-ACKs, it is judged whether the start symbol of the earliest PUCCH among the three PUCCHs satisfies following condition: after a time length T1 after the end symbols of the PDSCHs corresponding to the first and second HARQ-ACKs, and after a time duration T2 after the end symbols of the PDCCHs (if there is only one HARQ-ACK having a corresponding PDCCH, then the PDCCH corresponding to this HARQ-ACK) corresponding to the first HARQ-ACK and the second HARQ-ACKs. When neither of the HARQ-ACKs has a corresponding PDCCH, it is judged whether the start symbol of the earliest PUCCH among the three PUCCHs satisfies a following condition: after a time duration T1 after the end symbols of the PDSCHs corresponding to the first and second HARQ-ACKs; if the start symbol of the earliest PUCCH satisfies this condition, then the above operation of multiplexing and transmission is performed; if the start symbol of the earliest PUCCH does not satisfy this condition, then it is determined as an error case or the CSI is directly dropped; of course, it is not mandatory to perform judgment on the timeline, and it can also be specified that that the judgment on the timeline is not required, as long as a support to simultaneous transmission of the HARQ-ACK and CSI is configured, multiplexed transmission can be performed directly.

For a base station side, it is sufficient to determine, according to the above manners, how the terminal performs multiplexing and transmission, and perform reception according to the corresponding transmission scheme.

It should be noted that, in the above specific embodiments, if the CSI is replaced by CSI+SR, or by CSI+HARQ-ACK (including the SPS HARQ-ACK and/or the dynamic HARQ-ACK), or by CSI+HARQ-ACK+SR, or by HARQ-ACK, or by HARQ-ACK+SR, or by HARQ-ACK being more than 2-bit long, that is, when the PUCCH carrying the CSI carries one of the above cases, the method of the first embodiment is also applicable, wherein when the second UCI includes a HARQ-ACK, in one embodiment, the HARQ-ACK in the second UCI is a HARQ-ACK corresponding to eMBB or a low priority.

Second Embodiment

It is assumed that two PUCCHs carrying HARQ-ACKs and one PUCCH carrying the SR overlap, that is, the first UCI is the HARQ-ACK, and the second UCI is the SR.

First manner: always selecting a first HARQ-ACK (i.e., the HARQ-ACK with the earliest start symbol) among the plurality of HARQ-ACKs as the target HARQ-ACK, and multiplexing the SR and the first HARQ-ACK; in this manner, it is unnecessary to consider the PUCCH format used by the second HARQ-ACK and whether the second HARQ-ACK is a dynamic HARQ-ACK or a SPS HARQ-ACK, that is, for cases that the second HARQ-ACK uses any PUCCH format or whether the second HARQ-ACK corresponds to a PDCCH, it can be processed in this way.

Figure 6A:
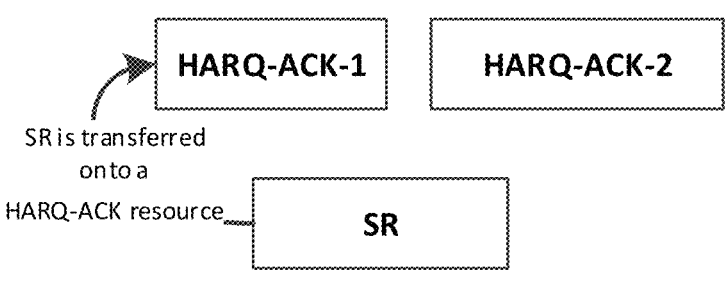
FIG. 6a and FIG. 6b are diagrams of two slot structures for transmissions of a first UCI and a second UCI in a first scenario of a second embodiment according to the transmission method in some embodiments of the present disclosure.
Figure 6B:
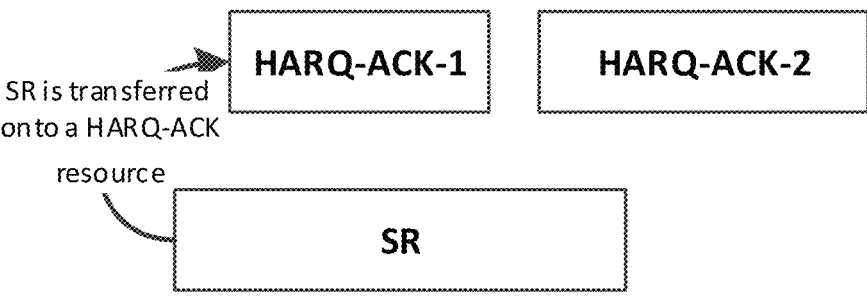

When the first HARQ-ACK uses the PUCCH format 0, then whether the SR uses the PUCCH format 0 or the PUCCH format 1, the state of the SR is implicitly expressed by transmitting the HARQ-ACK on the PUCCH resource of the first HARQ-ACK using a cyclic shift set, for transmitting the HARQ-ACK, corresponding to different SR states, that is, multiplexing the SR and the first HARQ-ACK specifically include: if the SR is negative, then when the negative SR is used, transmitting the HARQ-ACK (specifically, according to different states of 1-bit or 2-bit HARQ-ACK, a corresponding cyclic shift in the cyclic shift set is selected for transmission) by using a cyclic shift set corresponding to the HARQ-ACK.); if the SR is positive, then when the positive SR is used, transmitting the HARQ-ACK by using the cyclic shift set corresponding to the HARQ-ACK; since under the positive and negative SR, defined cyclic shift sets for transmitting HARQ-ACKs are different, the base station may implicitly obtain the state of the SR based on which cyclic shift of the cyclic shift sets is used to detect the HARQ-ACK, thereby enabling simultaneous transmission of HARQ-ACK and SR; as shown in FIG. 6a and FIG. 6b.

Figure 7A:
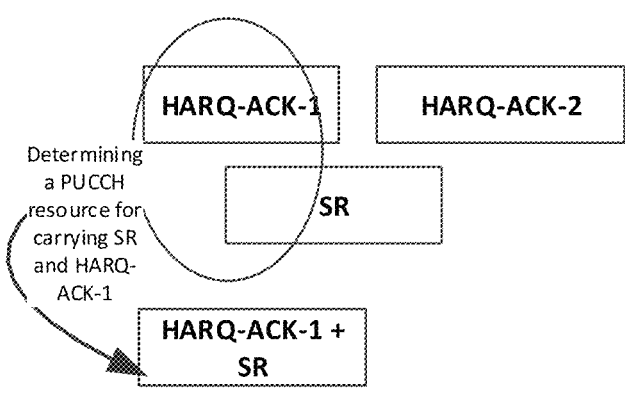

When the first HARQ-ACK uses any one of the PUCCH formats 2, 3, and 4, whether the SR uses the PUCCH format 0 or the PUCCH format 1, multiplexing the SR and the first HARQ-ACK for transmission specifically includes selecting one from a plurality of pre-configured PUCCH resource sets according to the total bit quantity of the first HARQ-ACK and the SR, and determining one PUCCH resource in the determined one PUCCH resource set according to a PUCCH resource indication field in the PDCCH corresponding to the first HARQ-ACK, and simultaneously transmitting the first HARQ-ACK and the SR on the determined one PUCCH resource, wherein the determined one PUCCH resource does not cross a sub-slot boundary, that is, in the same slot of a subframe as the first HARQ-ACK, and would not overlap with the second HARQ-ACK, and the second HARQ-ACK is no longer overlapped with the SR, and can be transmitted separately, as shown in FIG. 7a and FIG. 7b.

When the first HARQ-ACK uses the PUCCH format 1, then whether the SR uses the PUCCH format 0 or the PUCCH format 1, the SR cannot be multiplexed with the HARQ-ACK using the PUCCH format 1, according to the above-mentioned multiplexing transmission rule, and then, multiplexing the SR and the first HARQ-ACK specifically includes dropping the SR, and transmitting each HARQ-ACK on the PUCCH corresponding to the HARQ-ACK respectively, as shown in FIG. 8a and FIG. 8b.

In particular, before performing the above operation, it may be firstly judged whether the PUCCH carrying the first HARQ-ACK and the PUCCH carrying the CSI satisfy the timeline, that is, when the first HARQ-ACK is an HARQ-ACK with a corresponding PDCCH, it is judged whether the start symbol of the earliest one of the two PUCCHs satisfies following conditions: after a time duration T1 after the end symbol of the PDSCH corresponding to the first HARQ-ACK, and after a time duration T2 after the end symbol of the PDCCH corresponding to the first HARQ-ACK. If the first HARQ-ACK does not have a corresponding PDCCH, then it is judged whether the start symbol of the earliest one of the two PUCCHs satisfies a following condition: after a time duration T1 after the end symbol of the PDSCH corresponding to the first HARQ-ACK; if the start symbol satisfies this condition, then the above operation of multiplexing and transmission is performed; or if the start symbol does not satisfy this condition, it is determined as an erroneous scheduling or the CSI is dropped directly. Of course, the judgement on the timeline is not forced to be performed, it may also stipulated that the judgement on the timeline is unnecessary, then it may be considered that as long as support to simultaneous transmission of the HARQ-ACK and the CSI may be configured, the multiplexing and transmission may be directly performed.

Second manner: a first manifestation of the second manner is that the first PUCCH format is the PUCCH format 2, 3 or 4, a HARQ-ACK using the PUCCH format 2, 3 or 4 among the plurality of HARQ-ACKs is selected as the target HARQ-ACK, and the SR and the target HARQ-ACK are multiplexed.

Specifically, it is assumed that the first HARQ-ACK uses the PUCCH format 0 and the second HARQ-ACK PUCCH uses the PUCCH format 2, the target HARQ-ACK is determined as the second HARQ-ACK, and multiplexing the SR and the second HARQ-ACK according to the above multiplexing transmission rule specifically includes selecting one from a plurality of pre-configured PUCCH resource sets according to the total bit quantity of the second HARQ-ACK and the SR, determining one PUCCH resource in the determined one PUCCH resource set according to the PUCCH resource indication field in the PDCCH corresponding to the second HARQ-ACK, and simultaneously transmitting the second HARQ-ACK and the SR on the determined one PUCCH resource, wherein the determined one PUCCH resource does not cross a sub-slot boundary, that is, in the same slot of a subframe as the second HARQ-ACK, then would not overlap with the first HARQ-ACK, and the first HARQ-ACK is no longer overlapped with the SR, and can be transmitted separately, as shown in FIG. 9a and FIG. 9b.

It is assumed that each of the first HARQ-ACK and the second HARQ-ACK is transmitted using one of PUCCH formats 2, 3 and 4 (formats used by the first HARQ-ACK and the second HARQ-ACK may be the same or different, as long as the formats all belong to a set including the PUCCH formats 2, 3 and 4, then it is determined according to an order of transmission time that the target HARQ-ACK is the first HARQ-ACK, and the SR and the first HARQ-ACK are multiplexed according to the above multiplexing transmission rule. A specific process thereof is the same as a corresponding process in the above first manner, as shown in FIG. 7a and FIG. 7b.

It is assumed that neither of the two HARQ-ACKs is transmitted using a format of the PUCCH formats 2, 3 or 4, for example, any of the following may be adopted: 1) drop CSI, i.e., HARQ-ACKs are independently transmitted on PUCCH resources of the HARQ-ACKs, respectively, as shown in FIG. 8a and FIG. 8b; 2) the first HARQ-ACK of the plurality of HARQ-ACKs is selected as the target first UCI, and the specific process thereof is the same as a related process in the first manner, and how to perform the multiplexed transmission (as shown in FIG. 6a and FIG. 6b) or drop CSI (as shown in FIG. 8*a* and FIG. 8*b*) needs to be determined according to a PUCCH format used by the HARQ-ACK, the specific manner thereof is not repeated; 3) selecting an HARQ-ACK having a corresponding PDCCH among the plurality of HARQ-ACKs as a target HARQ-ACK; for example, only the first HARQ-ACK is an HARQ-ACK with a corresponding PDCCH, then the first HARQ-ACK is determined as the target HARQ-ACK, and the SR and the first HARQ-ACK are multiplexed according to the above multiplexing transmission rule, and the specific process thereof is the same as the related process in the first manner, as shown in FIG. 6*a*, FIG. 6*b*, FIG. 8*a*, and FIG. 8*b*, detailed description thereof is omitted; as another example, the two HARQ-ACKs are both HARQ-ACKs with corresponding PDCCHs, then the first HARQ-ACK is determined as the target HARQ-ACK according to an order of time, and the SR and the first HARQ-ACK are multiplexed according to the above multiplexing transmission rule, and a specific process thereof is the same as the related process in the first manner, as shown in FIG. 6*a*, FIG. 6*b*, FIG. 8*a*, and FIG. 8*b*, a detailed description is not repeated; as still another example, if neither of the two HARQ-ACKs has a corresponding PDCCH, then the SR is dropped, and HARQ-ACKs are transmitted on respective PUCCH resources of the HARQ-ACKs, as shown in FIG. 8*a* and FIG. 8*b*; 4) if the second PUCCH format is format 0, then the HARQ-ACK using the PUCCH format 0 among the plurality of HARQ-ACKs is selected as the target HARQ-ACK; for example, only the first HARQ-ACK uses the PUCCH format 0, then the first HARQ-ACK is selected as the target HARQ-ACK, the SR and the first HARQ-ACK are multiplexed, and the specific process thereof is the same as the related process in the first manner, as shown in FIG. 6*a* and FIG. 6*b*, and the detailed description is omitted; as another example, when the two HARQ-ACKs both use the PUCCH format 0, then the first HARQ-ACK is selected as the target HARQ-ACK, the SR and the first HARQ-ACK are multiplexed, and the specific process thereof is the same as the related process in the first manner, as shown in FIG. 6*a* and FIG. 6*b*, detailed description thereof is not repeated; as still another example, neither of the two HARQ-ACKs uses the PUCCH format 0, then the above 1), 2) or 3) above is reused and detailed description thereof is not repeated.

A second manifestation of the second manner is that the first PUCCH format is the PUCCH format 0, a HARQ-ACK using the PUCCH format 0 among the plurality of HARQ-ACKs is selected as the target HARQ-ACK, and the SR and the target HARQ-ACK are multiplexed.

Specifically, it is assumed that the first HARQ-ACK uses the PUCCH format 1 and the second HARQ-ACK PUCCH uses the PUCCH format 0, the target HARQ-ACK is determined as the second HARQ-ACK, and multiplexing the SR and the second HARQ-ACK according to the above multiplexing transmission rule specifically includes: if the SR is negative, then when a negative SR is used, transmitting the HARQ-ACK by using a cyclic shift set corresponding to the HARQ-ACK (specifically, selecting a corresponding cyclic shift from the cyclic shift set for transmission, based on different states of a 1-bit or 2-bit HARQ-ACK); if the SR is positive, the when a positive SR is used, transmitting the HARQ-ACK by using a cyclic shift set corresponding to the HARQ-ACK; since under the positive SR and the negative SR, defined cyclic shift sets for transmitting HARQ-ACKs are different, the base station may implicitly obtain the state of the SR based on which cyclic shift of the cyclic shift sets is used to detect the HARQ-ACK, thereby enabling simultaneous transmission of HARQ-ACK and SR; as shown in FIG. 10*a* and FIG. 10*b*.

It is assumed that both the first HARQ-ACK and the second HARQ-ACK use the PUCCH format 0, then the target HARQ-ACK is determined to be the first HARQ-ACK according to an order of transmission time, and the SR and the first HARQ-ACK are multiplexed according to the above multiplex transmission rule, and the specific process thereof is the same as the corresponding process in the first manner, as shown in FIG. 6*a* and FIG. 6*b*.

It is assumed that neither of the two HARQ-ACKs uses the PUCCH format 0, any of the following may be adopted: 1) drop SR, i.e., HARQ-ACKs are independently transmitted on PUCCH resources of the HARQ-ACKs, respectively, as shown in FIG. 8*a* and FIG. 8*b*; 2) the first HARQ-ACK of the plurality of HARQ-ACKs is selected as the target first UCI, and the specific process thereof is the same as a related process in the first manner, and how to perform the multiplexed transmission (as shown in FIG. 7*a* and FIG. 7*b*) or drop SR (as shown in FIG. 8*a* and FIG. 8*b*) needs to be determined according to a PUCCH format used by the HARQ-ACK, the specific manner thereof is not repeated; 3) an HARQ-ACK having a corresponding PDCCH among the plurality of HARQ-ACKs is selected as a target HARQ-ACK; for example, only the first HARQ-ACK is an HARQ-ACK with a corresponding PDCCH, then the first HARQ-ACK is determined as the target HARQ-ACK, and the SR and the first HARQ-ACK are multiplexed according to the above multiplexing transmission rule, and the specific process thereof is the same as the related process in the first manner, as shown in FIG. 7*a*, FIG. 7*b*, FIG. 8*a*, and FIG. 8*b*, detailed description thereof is omitted; as another example, the two HARQ-ACKs are both HARQ-ACKs with corresponding PDCCHs, then the first HARQ-ACK is determined as the target HARQ-ACK according to an order of time, and the SR and the first HARQ-ACK are multiplexed according to the above multiplexing transmission rule, and a specific process thereof is the same as the related process in the first manner, as shown in FIG. 6*a*, FIG. 6*b*, FIG. 8*a*, and FIG. 8*b*, a detailed description is not repeated; as still another example, if neither of the two HARQ-ACKs has a corresponding PDCCH, then the SR is dropped, and HARQ-ACKs are transmitted on respective PUCCH resources of the HARQ-ACKs, as shown in FIG. 8*a* and FIG. 8*b*; 4) if the second PUCCH format is a PUCCH format 2, 3, or 4, then the HARQ-ACK using the PUCCH format 2, 3, or 4 among the plurality of HARQ-ACKs is selected as the target HARQ-ACK; for example, only the first HARQ-ACK uses the PUCCH format 2, 3, or 4, then the first HARQ-ACK is selected as the target HARQ-ACK, the SR and the first HARQ-ACK are multiplexed, and the specific process thereof is the same as the related process in the first manner, as shown in FIG. 7*a* and FIG. 7*b*, and the detailed description is omitted; as another example, when the two HARQ-ACKs both use one of the PUCCH formats 2, 3 and 4, then the first HARQ-ACK is selected as the target HARQ-ACK, the SR and the first HARQ-ACK are multiplexed, and the specific process thereof is the same as the related process in the first manner, as shown in FIG. 7*a* and FIG. 7*b*, detailed description thereof is not repeated; as still another example, neither of the two HARQ-ACKs uses one of the PUCCH formats 2, 3 and 4, then the above 1), 2) or 3) above is reused and detailed description thereof is not repeated.

A third manifestation of the second manner is that the first PUCCH format is the PUCCH format 0, 2, 3 or 4, a HARQ-ACK using the PUCCH format 0, 2, 3 or 4 among the plurality of HARQ-ACKs is selected as the target HARQ-ACK, and the SR and the target HARQ-ACK are multiplexed.

Specifically, it is assumed that the first HARQ-ACK uses the PUCCH format 1 and the second HARQ-ACK PUCCH uses one of the PUCCH formats 0, 2, 3 and 4, the target HARQ-ACK is determined to be the second HARQ-ACK, and the SR and the second HARQ-ACK are multiplexed according to the above multiplexing transmission rule, a specific process thereof is the same as related processes in the above first and second manifestations in the second manner; and a multiplexing and transmission solution is determined according to whether the second HARQ-ACK uses the PUCCH format 0 or one of the PUCCH formats 2, 3, and 4, as shown in FIG. 9a and FIG. 9b or as shown in FIG. 10a and FIG. 10b.

It is assumed that each of the first HARQ-ACK and the second HARQ-ACK is transmitted using one of PUCCH formats 0, 2, 3 and 4 (PUCCH formats used by different HARQ-ACKs may be the same or different), then it is determined according to an order of transmission time that the target HARQ-ACK is the first HARQ-ACK, and the SR and the first HARQ-ACK are multiplexed according to the above multiplexing transmission rule. A specific process thereof is the same as a corresponding process in the above first manner, and a multiplexed transmission solution is determined according to whether a PUCCH format used by the first HARQ-ACK is specifically the PUCCH format 0 or the PUCCH format 2, 3 or 4, as shown in FIG. 6a and FIG. 6b or as shown in FIG. 7a and FIG. 7b.

It is assumed that neither of the two HARQ-ACKs uses one of the PUCCH formats 0, 2, 3 or 4, i.e., both of the two HARQ-ACKs use the PUCCH format 1, then the following may be adopted: drop SR, i.e., HARQ-ACKs are independently transmitted on PUCCH resources of the HARQ-ACKs, respectively, as shown in FIG. 8a and FIG. 8b.

In particular, before performing the above operation, it may be firstly judged whether the PUCCH carrying the first HARQ-ACK, the PUCCH carrying the second HARQ-ACK, and the PUCCH carrying the CSI satisfy the timeline. That is, when there is a HARQ-ACK having a corresponding PDCCH in the two HARQ-ACKs, it is judged whether the start symbol of the earliest PUCCH among the three PUCCHs satisfies following condition: after a time length T1 after the end symbols of the PDSCHs corresponding to the first and second HARQ-ACKs, and after a time duration T2 after the end symbols of the PDCCHs (if there is only one HARQ-ACK having a corresponding PDCCH, then the PDCCH corresponding to this HARQ-ACK) corresponding to the first HARQ-ACK and the second HARQ-ACKs. When neither of the HARQ-ACKs has a corresponding PDCCH, it is judged whether the start symbol of the earliest PUCCH among the three PUCCHs satisfies a following condition: after a time duration T1 after the end symbols of the PDSCHs corresponding to the first and second HARQ-ACKs; if the start symbol of the earliest PUCCH satisfies this condition, then the above operation of multiplexing and transmission is performed; if the start symbol of the earliest PUCCH does not satisfy this condition, then it is determined as an error case or the CSI is directly dropped; of course, it is not mandatory to perform judgment on the timeline, and it can also be specified that that the judgment on the timeline is not required, as long as a support to simultaneous transmission of the HARQ-ACK and CSI is configured, multiplexed transmission can be performed directly.

For a base station side, it is sufficient to determine, according to the above manners, how the terminal performs multiplexing and transmission, and perform reception according to the corresponding transmission scheme.

It should be noted that in the above specific embodiments, if the SR is replaced with a HARQ-ACK being no more than 2-bit long, that is, when the HARQ-ACK being no more than 2-bit long is carried on the PUCCH carrying the SR, the above embodiments are also applicable; optionally, in one embodiment, the HARQ-ACK in the second UCI is the HARQ-ACK corresponding to the eMBB or the low-priority.

It should be noted that, in this embodiment, relative positions between the PUCCH resource of the first UCI and the PUCCH resource of the second UCI are only examples. The start position of the PUCCH resource carrying the second UCI may be earlier than, or later than, or aligned with the start position of the PUCCH resource carrying the first one of the first UCIs; the end position of the PUCCH carrying the second UCI may be earlier than, or later than, or aligned with the end position of the PUCCH carrying the second HARQ-ACK.

Some embodiments of the present disclosure also provide a transmission method of uplink control information UCI, which is applied to a base station, and as shown in FIG. 11, the method includes steps S1101-S1102.

S1101: selecting one of a plurality of first UCIs as a target UCI, when there are multiple transmissions of the plurality of first UCIs, a plurality of Physical Uplink Control Channels (PUCCH) respectively carrying the first UCI do not overlap in time domain, and the plurality of PUCCHs carrying the first UCIs all overlap with a PUCCH carrying a second UCI in time domain;

S1102: receiving the target UCI and the second UCI according to a rule of multiplexing the target UCI and the second UCI.

By adopting the transmission method of uplink control information UCI described in some embodiments of the present disclosure, a first UCI carried on one Physical Uplink Control Channel (PUCCH) of a plurality of PUCCHs carrying the first UCI is selected as a target UCI, when the plurality of PUCCHs, carrying the first UCI, not overlapping in time domain, overlap with a PUCCH carrying a second UCI in time domain, and the target UCI is multiplexed with the second UCI and the target UCI and the second UCI are transmitted, to avoid a problem that since the plurality of PUCCHs, carrying the first UCI, that are not overlapped in time domain overlap with the PUCCH carrying the second UCI, a consequence that the plurality of first UCIs originally transmitted in a time-division manner need to be multiplexed on one PUCCH is caused and the transmission delay and the transmission performance of the first UCIs are affected.

Optionally, in the transmission method, one of the plurality of first UCIs is selected as a target UCI according to one of the following: selecting a first UCI, with an earliest start symbol, among the plurality of first UCIs as the target UCI; selecting a first UCI using a first PUCCH format among the plurality of first UCIs as the target UCI.

Optionally, in the transmission method, when the first UCI with the earliest start symbol among the plurality of first UCIs is selected as the target UCI, before receiving the target UCI and the second UCI according to the rule of multiplexing the target UCI and the second UCI, the method further includes: determining whether a PUCCH carrying the target UCI and a PUCCH carrying the second UCI satisfy a predetermined time condition; if the predetermined time condition is satisfied, determining that the target UCI and the second UCI are multiplexed.

Optionally, in the transmission method, when selecting the first UCI with the earliest start symbol among the plurality of first UCIs as the target UCI, and when a preset condition is satisfied, receiving the target UCI and the second UCI according to the rule of multiplexing the target UCI and the second UCI includes: determining that the second UCI is discarded, or determining that the second UCI and the target UCI are multiplexed on a PUCCH corresponding to the second UCI; wherein the preset condition is at least one of the following: a condition that the second UCI at least includes the CSI, and the target UCI does not have a corresponding PDCCH; a condition that the number of bits of the second UCI is greater than a preset bit quantity, and the target UCI does not have a corresponding PDCCH; a condition that the second UCI is an SR, and the target UCI does not have a corresponding PDCCH; a condition that the second UCI is an HARQ-ACK having a bit quantity less than or equal to a preset bit quantity, and the target UCI does not have a corresponding PDCCH; a condition that the second UCI is the SR, and the PUCCH format 1 is used for transmission of the target UCI; a condition that the second UCI is an HARQ-ACK having a bit quantity less than or equal to a preset bit quantity, and a PUCCH format 1 is used for transmission of the target UCI.

Optionally, in the transmission method, when selecting, among the plurality of first UCIs, the first UCI having the first PUCCH format as the target UCI, before selecting one of the plurality of first UCIs as the target UCI, the method further includes: determining whether a predetermined time condition is satisfied between the plurality of PUCCHs carrying the first UCI and the PUCCH carrying the second UCI; selecting a first UCI having a first PUCCH format as the target UCI if the predetermined time condition is satisfied.

Optionally, in the transmission method, selecting, among the plurality of first UCIs, the first UCI having the first PUCCH format as the target UCI includes: when there are at least two first UCIs having the first PUCCH format, selecting, among the first UCIs having the first PUCCH format, a first UCI having an earliest start symbol as the target UCI.

Optionally, in the transmission method, selecting, among the plurality of first UCIs, the first UCI having the first PUCCH format as the target UCI includes: when there is no first UCI using the first PUCCH format, selecting the target UCI according to one of following, or determining that the second UCI is discarded: 1) selecting a first UCI with an earliest start symbol, among the plurality of first UCIs, as the target UCI; 2) selecting a first UCI having a corresponding PDCCH among the plurality of first UCIs as the target UCI; 3) selecting the first UCI with a second PUCCH format among the plurality of first UCIs as the target UCI; wherein when the first PUCCH format is a PUCCH format 0, the second PUCCH format includes at least one of a PUCCH format 2, a PUCCH format 3, and a PUCCH format 4; when the first PUCCH format is at least one of the PUCCH format 2, the PUCCH format 3, and the PUCCH format 4, the second PUCCH format is the PUCCH format 0.

Optionally, in the transmission method, selecting the first UCI having the second PUCCH format among the plurality of first UCIs as the target UCI includes at least one of the following: 1) when there are at least two first UCIs using the second PUCCH format, selecting, among first UCIs using the second PUCCH format, a first UCI with the earliest start symbol as the target UCI; 2) when there is no first UCI using the second PUCCH format, selecting the first UCI with the earliest start symbol among the plurality of first UCIs as the target UCI, or selecting, among the plurality of first UCIs, a first UCI having a corresponding PDCCH as the target UCI, or determining that the second UCI is discarded.

Optionally, in the transmission method, selecting, among the plurality of first UCIs, a first UCI having a corresponding PDCCH as the target UCI includes at least one of the following: 1) when there are at least two first UCIs having corresponding PDCCHs, selecting, among the first UCIs having the corresponding PDCCHs, the first UCI having the earliest start symbol as the target UCI; 2) when there is no first UCI with a corresponding PDCCH, selecting, among the plurality of first UCIs, the first UCI with the earliest start symbol as the target UCI; or determining that the second UCI is discarded.

Optionally, in the transmission method, the first PUCCH format includes at least one of a PUCCH format 2, a PUCCH format 3, and a PUCCH format 4; or, when the second UCI at least includes the CSI, or when the second UCI at least includes the HARQ-ACK, or when the quantity of bits of the second UCI is greater than a preset bit quantity, the first PUCCH format includes at least one of the PUCCH format 2, the PUCCH format 3, and the PUCCH format 4; or, when the second UCI is the SR, or when the quantity of bits of the second UCI is less than or equal to the preset bit quantity, the first PUCCH format includes at least one of the PUCCH format 0, the PUCCH format 2, the PUCCH format 3, and the PUCCH format 4; or, when the second UCI is HARQ-ACK and the quantity of bits of the second UCI is greater than the preset bit quantity, the first PUCCH format includes at least one of the PUCCH format 2, the PUCCH format 3 and the PUCCH format 4; or, when the second UCI is the HARQ-ACK, and the quantity of bits of the second UCI is less than or equal to the preset bit quantity, the first PUCCH format includes at least one of the PUCCH format 0, the PUCCH format 2, the PUCCH format 3, and the PUCCH format 4.

Optionally, in the transmission method, the first UCI includes a Hybrid Automatic Repeat reQuest (HARD) Acknowledgement (ACK), HARQ-ACK; the second UCI includes at least one of Channel State information (CSI), a Scheduling Request (SR), and a HARQ-ACK.

Optionally, in the transmission method, when the second UCI includes the HARQ-ACK, service types corresponding to the first UCI and the second UCI are different or priority levels of services corresponding to the first UCI and the second UCI are different, or priority levels of the first UCI and the second UCI are different; and/or, when the second UCI includes at least one of the CSI and the SR, service types corresponding to the first UCI and the second UCI are same or different, or priority levels of service types corresponding to the first UCI and the second UCI are same or different, or priority levels of the first UCI and the second UCI are same or different.

Optionally, in the transmission method, the plurality of PUCCHs, carrying the first UCI, not overlapped in time domain are transmitted in different sub-slots.

Optionally, in the transmission method, receiving the target UCI and the second UCI according to a rule of multiplexing the target UCI and the second UCI includes: determining a target PUCCH for transmitting the target UCI and the second UCI simultaneously; receiving the target UCI and the second UCI on the target PUCCH; wherein the target PUCCH does not overlap in time domain with any one PUCCHs carrying a first UCI, other than the target UCI, of the plurality of first UCIs, or the target PUCCH and the PUCCH carrying the target UCI are in the same sub-slot.

It should be noted that, by adopting the transmission method of the uplink control information UCI described in some embodiments of the present disclosure, and when the method is applied to the base station side, a specific manner of selecting one of the plurality of first UCIs as the target UCI, and determining a multiplexing transmission rule of multiplexing the target UCI and the second UCI when receiving the target UCI and the second UCI according to the rule of multiplexing the target UCI and the second UCI may be obtained by referring to FIGS. 2 to FIG. 10*b*, and the detailed description of the above specific embodiments, which will not be described in detail herein.

Some embodiments of the present disclosure also provide a terminal. As shown in FIG. 12, the terminal includes a processor 1201 and a storage 1203 connected to the processor 1201 through a bus interface 1202, the storage 1203 is configured for storing programs and data used by the processor 1201 when performing operations, and a transceiver 1204 is connected to the bus interface 1202 and used for receiving and transmitting data under the control of the processor 1201.

When the processor 1201 invokes and executes the programs and the data stored in the storage 1203, the following processes are executed: selecting one of a plurality of first UCIs as a target UCI, when there are multiple transmissions of the plurality of first UCIs, a plurality of Physical Uplink Control Channels (PUCCH) respectively carrying the first UCI do not overlap in time domain, and the plurality of PUCCHs carrying the first UCI all overlap with a PUCCH carrying a second UCI in time domain; multiplexing the target UCI and the second UCI.

Optionally, in the terminal, the processor 1201 selects one of the plurality of first UCIs as the target UCI according to one of the following: selecting a first UCI, with an earliest start symbol, among the plurality of first UCIs as the target UCI; selecting a first UCI using a first PUCCH format among the plurality of first UCIs as the target UCI.

Optionally, in the terminal, when selecting the first UCI, with the earliest start symbol, among the plurality of first UCIs as the target UCI, and before multiplexing the target UCI and the second UCI, the processor 1201 is configured to invokes and executes the programs and the data, to further execute: determining whether a PUCCH carrying the target UCI and a PUCCH carrying the second UCI satisfy a predetermined time condition; if the predetermined time condition is satisfied, multiplexing the target UCI and the second UCI.

Optionally, in the terminal, when selecting the first UCI, with the earliest start symbol, among the plurality of first UCIs as the target UCI, and when the preset condition is satisfied, multiplexing the target UCI and the second UCI performed by the processor 1201 includes: discarding the second UCI, or multiplexing the second UCI and the target UCI on a PUCCH corresponding to the second UCI; wherein the preset condition is at least one of the following: a condition that the second UCI at least includes the CSI, and the target UCI does not have a corresponding PDCCH; a condition that the number of bits of the second UCI is greater than a preset bit quantity, and the target UCI does not have a corresponding PDCCH; a condition that the second UCI is an SR, and the target UCI does not have a corresponding PDCCH; a condition that the second UCI is an HARQ-ACK having a bit quantity less than or equal to a preset bit quantity, and the target UCI does not have a corresponding PDCCH; a condition that the second UCI is the SR, and the PUCCH format 1 is used for transmission of the target UCI; a condition that the second UCI is an HARQ-ACK having a bit quantity less than or equal to a preset bit quantity, and a PUCCH format 1 is used for transmission of the target UCI.

Optionally, in the terminal, when selecting, among the plurality of first UCIs, the first UCI having the first PUCCH format as the target UCI, and before selecting one of the plurality of first UCIs as the target UCI, when the processor invokes the programs and the data, the processor further implements: determining whether a predetermined time condition is satisfied between the plurality of PUCCHs carrying the first UCI and the PUCCH carrying the second UCI; selecting a first UCI having a first PUCCH format as the target UCI if the predetermined time condition is satisfied.

Optionally, in the terminal, selecting, among the plurality of first UCIs, the first UCI having the first PUCCH format as the target UCI performed by the processor 1201 includes: when there are at least two first UCIs having the first PUCCH format, selecting, among the first UCIs having the first PUCCH format, a first UCI having an earliest start symbol as the target UCI.

Optionally, in the terminal, selecting, among the plurality of first UCIs, the first UCI having the first PUCCH format as the target UCI performed by the processor 1201 includes: when there is no first UCI using the first PUCCH format, selecting the target UCI according to one of the following, or discarding the second UCI: 1) selecting a first UCI with an earliest start symbol, among the plurality of first UCIs as the target UCI; 2) selecting a first UCI having a corresponding PDCCH among the plurality of first UCIs as the target UCI; 3) selecting the first UCI with a second PUCCH format among the plurality of first UCIs as the target UCI; wherein when the first PUCCH format is a PUCCH format 0, the second PUCCH format includes at least one of a PUCCH format 2, a PUCCH format 3, and a PUCCH format 4; when the first PUCCH format is at least one of the PUCCH format 2, the PUCCH format 3, and the PUCCH format 4, the second PUCCH format is the PUCCH format 0.

Optionally, in the terminal, selecting the first UCI having the second PUCCH format among the plurality of first UCIs as the target UCI performed by the processor 1201 includes at least one of the following: 1) when there are at least two first UCIs using the second PUCCH format, selecting, among first UCIs using the second PUCCH format, a first UCI with the earliest start symbol as the target UCI; 2) when there is no first UCI using the second PUCCH format, selecting the first UCI with the earliest start symbol among the plurality of first UCIs as the target UCI, or selecting, among the plurality of first UCIs, a first UCI having a corresponding PDCCH as the target UCI, or discarding the second UCI.

Optionally, in the terminal, selecting, among the plurality of first UCIs, a first UCI having a corresponding PDCCH as the target UCI performed by the processor 1201 includes at least one of the following: 1) when there are at least two first UCIs having corresponding PDCCHs, selecting, among the first UCIs having the corresponding PDCCHs, the first UCI having the earliest start symbol as the target UCI; 2) when there is no first UCI with a corresponding PDCCH, selecting, among the plurality of first UCIs, the first UCI with the earliest start symbol as the target UCI, or discarding the second UCI.

Optionally, in the terminal, the first PUCCH format includes at least one of the PUCCH format 2, the PUCCH format 3, and the PUCCH format 4; or, when the second UCI at least includes the CSI, or when the second UCI at least includes the HARQ-ACK, or when the quantity of bits of the second UCI is greater than a preset bit quantity, the first PUCCH format includes at least one of the PUCCH format 2, the PUCCH format 3, and the PUCCH format 4; or, when the second UCI is the SR, or when the quantity of bits of the second UCI is less than or equal to the preset bit quantity, the first PUCCH format includes at least one of the PUCCH format 0, the PUCCH format 2, the PUCCH format 3, and the PUCCH format 4; or, when the second UCI is HARQ-ACK and the quantity of bits of the second UCI is greater than the preset bit quantity, the first PUCCH format includes at least one of the PUCCH format 2, the PUCCH format 3 and the PUCCH format 4; or, when the second UCI is the HARQ-ACK, and the quantity of bits of the second UCI is less than or equal to the preset bit quantity, the first PUCCH format includes at least one of the PUCCH format 0, the PUCCH format 2, the PUCCH format 3, and the PUCCH format 4.

Optionally, in the terminal, the first UCI includes a Hybrid Automatic Repeat reQuest (HARQ) Acknowledgement (ACK), HARQ-ACK; the second UCI includes at least one of Channel State information (CSI), a Scheduling Request (SR), and a HARQ-ACK.

Optionally, in the terminal, when the second UCI includes the HARQ-ACK, service types corresponding to the first UCI and the second UCI are different or priority levels of services corresponding to the first UCI and the second UCI are different, or priority levels of the first UCI and the second UCI are different; and/or, when the second UCI includes at least one of the CSI and the SR, service types corresponding to the first UCI and the second UCI are same or different, or priority levels of service types corresponding to the first UCI and the second UCI are same or different, or priority levels of the first UCI and the second UCI are same or different.

Optionally, in the terminal, the plurality of PUCCHs, carrying the first UCI, not overlapped in time domain are transmitted in different sub-slots.

Optionally, in the terminal, multiplexing the target UCI and the second UCI performed by the processor 1201 includes: determining a target PUCCH for transmitting the target UCI and the second UCI simultaneously; multiplexing the target UCI and the second UCI on the target PUCCH; wherein the target PUCCH does not overlap in time domain with any one PUCCH carrying a first UCI, other than the target UCI, of the plurality of first UCIs, or the target PUCCH and the PUCCH carrying the target UCI are in the same sub-slot.

It should be noted that in FIG. 12, a bus architecture may include any number of interconnected buses and bridges. Specifically, various circuits such as one or more processors represented by the processor 1201 and a memory represented by the storage 1203 are linked together. The bus architecture may also link together various other circuits, such as peripherals, voltage regulators, and power management circuits, all of which are well known in the art and thus will not be described further herein. The bus interface provides an interface. The transceiver 1204 may be a plurality of elements, i.e., including a transmitter and a receiving, for providing a unit for communicating with various other devices over a transmission medium. A user interface 1205 in different terminals may also be an interface capable of externally or internally interfacing desired devices, including, but not limited to, keypads, displays, speakers, microphones, joysticks, and the like. The processor 1201 is responsible for managing the bus architecture and general processing, and the storage 1203 may store data used by the processor 1201 when performing operations.

It will be understood by those skilled in the art that all or part of the steps for implementing the above-described embodiments may be performed by hardware, or may be performed by a computer program indicating a relevant hardware. The computer program includes instructions for performing some or all of the steps of the above method, and the computer program may be stored in a readable storage medium, which may be any form of storage media.

Some embodiments of the present disclosure also provide a base station. The base station, as shown in FIG. 13, includes a processor 1200, a storage 1320 connected to the processor 1300 through a bus interface 1330, and a transceiver 1310 connected to the processor 1300 through a bus interface. The storage 1320 is configured to store programs and data used by the processor when performing operations; data information or a pilot is sent through the transceiver 1310 and an uplink control channel is received through the transceiver 1310. When the processor 1300 invokes and executes the programs and data stored in the storage 1320, following functional modules are implemented by the processor 1300. The processor 1300 is configured to read the program in the storage 1320 to perform the following processes: selecting one of a plurality of first UCIs as a target UCI, when there are multiple transmissions of the plurality of first UCIs, a plurality of Physical Uplink Control Channels (PUCCH) respectively carrying the first UCI do not overlap in time domain, and the plurality of PUCCHs carrying the first UCI all overlap with a PUCCH carrying a second UCI in time domain; and receiving the target UCI and the second UCI according to a rule of multiplexing the target UCI and the second UCI.

Optionally, in the base station, one of the plurality of first UCIs is selected as a target UCI by the processor 1300 according to one of the following: selecting a first UCI, with an earliest start symbol, among the plurality of first UCIs as the target UCI; selecting a first UCI using a first PUCCH format among the plurality of first UCIs as the target UCI.

Optionally, in the base station, when the first UCI with the earliest start symbol among the plurality of first UCIs is selected as the target UCI, before receiving the target UCI and the second UCI according to the rule of multiplexing the target UCI and the second UCI performed by the processor 1300, the processor 1300 is further configured to read the program to implement following: determining whether a PUCCH carrying the target UCI and a PUCCH carrying the second UCI satisfy a predetermined time condition; if the predetermined time condition is satisfied, determining that the target UCI and the second UCI are multiplexed.

Optionally, in the base station, when selecting the first UCI with the earliest start symbol among the plurality of first UCIs as the target UCI, and when a preset condition is satisfied, receiving the target UCI and the second UCI according to the rule of multiplexing the target UCI and the second UCI performed by the processor 1300 includes: determining that the second UCI is discarded, or determining that the second UCI and the target UCI are multiplexed on a PUCCH corresponding to the second UCI; wherein the preset condition is at least one of the following: a condition that the second UCI at least includes the CSI, and the target UCI does not have a corresponding PDCCH; a condition that the number of bits of the second UCI is greater than a preset bit quantity, and the target UCI does not have a corresponding PDCCH; a condition that the second UCI is an SR, and the target UCI does not have a corresponding PDCCH; a condition that the second UCI is an HARQ-ACK having a bit quantity less than or equal to a preset bit quantity, and the target UCI does not have a corresponding PDCCH; a condition that the second UCI is the SR, and the PUCCH format 1 is used for transmission of the target UCI;

a condition that the second UCI is an HARQ-ACK having a bit quantity less than or equal to a preset bit quantity, and a PUCCH format 1 is used for transmission of the target UCI.

Optionally, in the base station, when selecting, among the plurality of first UCIs, the first UCI having the first PUCCH format as the target UCI, before selecting one of the plurality of first UCIs as the target UCI performed by the processor 1300, the processor is further configured to read the program to implement following: determining whether a predetermined time condition is satisfied between the plurality of PUCCHs carrying the first UCI and the PUCCH carrying the second UCI; selecting a first UCI having a first PUCCH format as the target UCI if the predetermined time condition is satisfied.

Optionally, in the base station, selecting, among the plurality of first UCIs, the first UCI having the first PUCCH format as the target UCI performed by the processor 1300 includes: when there are at least two first UCIs having the first PUCCH format, selecting, among the first UCIs having the first PUCCH format, a first UCI having an earliest start symbol as the target UCI.

Optionally, in the base station, selecting, among the plurality of first UCIs, the first UCI having the first PUCCH format as the target UCI performed by the processor 1300 includes: when there is no first UCI using the first PUCCH format, selecting the target UCI according to one of following, or determining that the second UCI is discarded: 1) selecting a first UCI with an earliest start symbol, among the plurality of first UCIs, as the target UCI; 2) selecting a first UCI having a corresponding PDCCH among the plurality of first UCIs as the target UCI; 3) selecting the first UCI with a second PUCCH format among the plurality of first UCIs as the target UCI; wherein when the first PUCCH format is a PUCCH format 0, the second PUCCH format includes at least one of a PUCCH format 2, a PUCCH format 3, and a PUCCH format 4; when the first PUCCH format is at least one of the PUCCH format 2, the PUCCH format 3, and the PUCCH format 4, the second PUCCH format is the PUCCH format 0.

Optionally, in the base station, selecting the first UCI having the second PUCCH format among the plurality of first UCIs as the target UCI performed by the processor 1300 includes at least one of the following: 1) when there are at least two first UCIs using the second PUCCH format, selecting, among first UCIs using the second PUCCH format, a first UCI with the earliest start symbol as the target UCI; 2) when there is no first UCI using the second PUCCH format, selecting the first UCI with the earliest start symbol among the plurality of first UCIs as the target UCI, or selecting, among the plurality of first UCIs, a first UCI having a corresponding PDCCH as the target UCI, or determining that the second UCI is discarded.

Optionally, in the base station, selecting, among the plurality of first UCIs, a first UCI having a corresponding PDCCH as the target UCI performed by the processor 1300 includes at least one of the following: 1) when there are at least two first UCIs having corresponding PDCCHs, selecting, among the first UCIs having the corresponding PDCCHs, the first UCI having the earliest start symbol as the target UCI; 2) when there is no first UCI with a corresponding PDCCH, selecting, among the plurality of first UCIs, the first UCI with the earliest start symbol as the target UCI; or determining that the second UCI is discarded.

Optionally, in the base station, the first PUCCH format includes at least one of a PUCCH format 2, a PUCCH format 3, and a PUCCH format 4; or, when the second UCI at least includes the CSI, or when the second UCI at least includes the HARQ-ACK, or when the quantity of bits of the second UCI is greater than a preset bit quantity, the first PUCCH format includes at least one of the PUCCH format 2, the PUCCH format 3, and the PUCCH format 4; or, when the second UCI is the SR, or when the quantity of bits of the second UCI is less than or equal to the preset bit quantity, the first PUCCH format includes at least one of the PUCCH format 0, the PUCCH format 2, the PUCCH format 3, and the PUCCH format 4; or, when the second UCI is HARQ-ACK and the quantity of bits of the second UCI is greater than the preset bit quantity, the first PUCCH format includes at least one of the PUCCH format 2, the PUCCH format 3 and the PUCCH format 4; or, when the second UCI is the HARQ-ACK, and the quantity of bits of the second UCI is less than or equal to the preset bit quantity, the first PUCCH format includes at least one of the PUCCH format 0, the PUCCH format 2, the PUCCH format 3, and the PUCCH format 4.

Optionally, in the base station, the first UCI includes a Hybrid Automatic Repeat reQuest (HARD) Acknowledgement (ACK), HARQ-ACK; the second UCI includes at least one of Channel State information (CSI), a Scheduling Request (SR), and a HARQ-ACK.

Optionally, in the base station, when the second UCI includes the HARQ-ACK, service types corresponding to the first UCI and the second UCI are different or priority levels of services corresponding to the first UCI and the second UCI are different, or priority levels of the first UCI and the second UCI are different; and/or, when the second UCI includes at least one of the CSI and the SR, service types corresponding to the first UCI and the second UCI are same or different, or priority levels of service types corresponding to the first UCI and the second UCI are same or different, or priority levels of the first UCI and the second UCI are same or different.

Optionally, in the base station, the plurality of PUCCHs, carrying the first UCI, not overlapped in time domain are transmitted in different sub-slots.

Optionally, in the base station, receiving the target UCI and the second UCI according to a rule of multiplexing the target UCI and the second UCI includes: determining a target PUCCH for transmitting the target UCI and the second UCI simultaneously; receiving the target UCI and the second UCI on the target PUCCH; wherein the target PUCCH does not overlap in time domain with any one PUCCH carrying a first UCI, other than the target UCI, of the plurality of first UCIs, or the target PUCCH and the PUCCH carrying the target UCI are in the same sub-slot.

Additionally, in FIG. 13, a bus architecture may include any number of interconnected buses and bridges. Specifically, various circuits such as one or more processors represented by the processor 1300 and a memory represented by the storage 1320 are linked together. The bus architecture can also link various other circuits such as peripherals, voltage regulators, power management circuits, etc., which are all known in the art, and therefore, will not be further described herein. A bus interface provides an interface. The transceiver 1310 may be a plurality of elements, including a transmitter and a receiver, and provide a unit for communicating with various other devices on the transmission medium. The processor 1300 is responsible for managing the bus architecture and general processing, and the storage 1320 can store data used by the processor 1300 when performing operations.

Some embodiments of the present disclosure also provide a transmission device of uplink control information UCI.

The transmission device is applied to a terminal. As shown in FIG. 14, the device includes a first selection module 1410 and a transmission module 1420.

The first selection module 1410 is configured for selecting one of a plurality of first UCIs as a target UCI, when there are multiple transmissions of the plurality of first UCIs, a plurality of Physical Uplink Control Channels (PUCCH) respectively carrying the first UCI do not overlap in time domain, and the plurality of PUCCHs carrying the first UCI all overlap with a PUCCH carrying a second UCI in time domain.

The transmission module 1420 is configured for multiplexing the target UCI and the second UCI.

Optionally, in the transmission device, the first selection module 1410 selects one of the plurality of first UCIs as the target UCI according to one of the following: selecting a first UCI, with an earliest start symbol, among the plurality of first UCIs as the target UCI; selecting a first UCI using a first PUCCH format among the plurality of first UCIs as the target UCI.

Optionally, in the transmission device, when the first selection module 1410 selects the first UCI, with the earliest start symbol, among the plurality of first UCIs as the target UCI, and before multiplexing the target UCI and the second UCI, the first selection module 1410 is further configured for: determining whether a PUCCH carrying the target UCI and a PUCCH carrying the second UCI satisfy a predetermined time condition; and the transmission module is further configured for, if the predetermined time condition is satisfied, multiplexing the target UCI and the second UCI.

Optionally, in the transmission device, when the first selection module 1410 selects the first UCI, with the earliest start symbol, among the plurality of first UCIs as the target UCI, and when the preset condition is satisfied, multiplexing the target UCI and the second UCI includes: discarding the second UCI, or multiplexing the second UCI and the target UCI on a PUCCH corresponding to the second UCI; wherein the preset condition is at least one of the following: a condition that the second UCI at least includes the CSI, and the target UCI does not have a corresponding PDCCH; a condition that the number of bits of the second UCI is greater than a preset bit quantity, and the target UCI does not have a corresponding PDCCH; a condition that the second UCI is an SR, and the target UCI does not have a corresponding PDCCH; a condition that the second UCI is an HARQ-ACK having a bit quantity less than or equal to a preset bit quantity, and the target UCI does not have a corresponding PDCCH; a condition that the second UCI is the SR, and the PUCCH format 1 is used for transmission of the target UCI; a condition that the second UCI is an HARQ-ACK having a bit quantity less than or equal to a preset bit quantity, and a PUCCH format 1 is used for transmission of the target UCI.

Optionally, in the transmission device, when the first selection module 1410 selects, among the plurality of first UCIs, the first UCI having the first PUCCH format as the target UCI, and before selecting one of the plurality of first UCIs as the target UCI, the first selection module is further configure for: determining whether a predetermined time condition is satisfied between the plurality of PUCCHs carrying the first UCI and the PUCCH carrying the second UCI; selecting a first UCI having a first PUCCH format as the target UCI if the predetermined time condition is satisfied.

Optionally, in the transmission device, selecting, among the plurality of first UCIs, the first UCI having the first PUCCH format as the target UCI performed by the first selection module 1410 includes: when there are at least two first UCIs having the first PUCCH format, selecting, among the first UCIs having the first PUCCH format, a first UCI having an earliest start symbol as the target UCI.

Optionally, in the transmission device, selecting, among the plurality of first UCIs, the first UCI having the first PUCCH format as the target UCI performed by the first selection module 1410 includes: when there is no first UCI using the first PUCCH format, selecting the target UCI according to one of the following, or discarding the second UCI: 1) selecting a first UCI with an earliest start symbol, among the plurality of first UCIs as the target UCI; 2) selecting a first UCI having a corresponding PDCCH among the plurality of first UCIs as the target UCI; 3) selecting the first UCI with a second PUCCH format among the plurality of first UCIs as the target UCI; wherein when the first PUCCH format is a PUCCH format 0, the second PUCCH format includes at least one of a PUCCH format 2, a PUCCH format 3, and a PUCCH format 4; when the first PUCCH format is at least one of the PUCCH format 2, the PUCCH format 3, and the PUCCH format 4, the second PUCCH format is the PUCCH format 0.

Optionally, in the transmission device, selecting the first UCI having the second PUCCH format among the plurality of first UCIs as the target UCI performed by the first selection module 1410 includes at least one of the following: 1) when there are at least two first UCIs using the second PUCCH format, selecting, among first UCIs using the second PUCCH format, a first UCI with the earliest start symbol as the target UCI; 2) when there is no first UCI using the second PUCCH format, selecting the first UCI with the earliest start symbol among the plurality of first UCIs as the target UCI, or selecting, among the plurality of first UCIs, a first UCI having a corresponding PDCCH as the target UCI, or discarding the second UCI.

Optionally, in the transmission device, selecting, among the plurality of first UCIs, a first UCI having a corresponding PDCCH as the target UCI performed by the first selection module 1410 includes at least one of the following: 1) when there are at least two first UCIs having corresponding PDCCHs, selecting, among the first UCIs having the corresponding PDCCHs, the first UCI having the earliest start symbol as the target UCI; 2) when there is no first UCI with a corresponding PDCCH, selecting, among the plurality of first UCIs, the first UCI with the earliest start symbol as the target UCI, or discarding the second UCI.

Optionally, in the transmission device, the first PUCCH format includes at least one of the PUCCH format 2, the PUCCH format 3, and the PUCCH format 4; or, when the second UCI at least includes the CSI, or when the second UCI at least includes the HARQ-ACK, or when the quantity of bits of the second UCI is greater than a preset bit quantity, the first PUCCH format includes at least one of the PUCCH format 2, the PUCCH format 3, and the PUCCH format 4; or, when the second UCI is the SR, or when the quantity of bits of the second UCI is less than or equal to the preset bit quantity, the first PUCCH format includes at least one of the PUCCH format 0, the PUCCH format 2, the PUCCH format 3, and the PUCCH format 4; or, when the second UCI is HARQ-ACK and the quantity of bits of the second UCI is greater than the preset bit quantity, the first PUCCH format includes at least one of the PUCCH format 2, the PUCCH format 3 and the PUCCH format 4; or, when the second UCI is the HARQ-ACK, and the quantity of bits of the second UCI is less than or equal to the preset bit quantity, the first PUCCH format includes at least one of the PUCCH format 0, the PUCCH format 2, the PUCCH format 3, and the PUCCH format 4.

Optionally, in the transmission device, the first UCI includes a Hybrid Automatic Repeat reQuest (HARQ) Acknowledgement (ACK), HARQ-ACK; the second UCI includes at least one of Channel State information (CSI), a Scheduling Request (SR), and a HARQ-ACK.

Optionally, in the transmission device, when the second UCI includes the HARQ-ACK, service types corresponding to the first UCI and the second UCI are different or priority levels of services corresponding to the first UCI and the second UCI are different, or priority levels of the first UCI and the second UCI are different; and/or, when the second UCI includes at least one of the CSI and the SR, service types corresponding to the first UCI and the second UCI are same or different, or priority levels of service types corresponding to the first UCI and the second UCI are same or different, or priority levels of the first UCI and the second UCI are same or different.

Optionally, in the transmission device, the plurality of PUCCHs, carrying the first UCI, not overlapped in time domain are transmitted in different sub-slots.

Optionally, in the transmission device, multiplexing the target UCI and the second UCI performed by the transmission module 1420 includes: determining a target PUCCH for transmitting the target UCI and the second UCI simultaneously; multiplexing the target UCI and the second UCI on the target PUCCH; wherein the target PUCCH does not overlap in time domain with any one PUCCH carrying a first UCI, other than the target UCI, of the plurality of first UCIs, or the target PUCCH and the PUCCH carrying the target UCI are in the same sub-slot.

Some embodiments of the present disclosure also provide a transmission device of uplink control information (UCI). The transmission device is applied to a base station. As shown in FIG. 15, the device includes a second selection module 1510 and a reception module 1520.

The second selection module 1510 is configured for selecting one of a plurality of first UCIs as a target UCI, when there are multiple transmissions of the plurality of first UCIs, a plurality of Physical Uplink Control Channels (PUCCH) respectively carrying the first UCI do not overlap in time domain, and the plurality of PUCCHs carrying the first UCI all overlap with a PUCCH carrying a second UCI in time domain. The reception module 1520 is configured for receiving the target UCI and the second UCI according to a rule of multiplexing the target UCI and the second UCI.

Optionally, in the transmission device, one of the plurality of first UCIs is selected as a target UCI by the second selection module 1510 according to one of the following: selecting a first UCI, with an earliest start symbol, among the plurality of first UCIs as the target UCI; selecting a first UCI using a first PUCCH format among the plurality of first UCIs as the target UCI.

Optionally, in the transmission device, when the first UCI with the earliest start symbol among the plurality of first UCIs is selected as the target UCI by the second selection module 1510, before receiving the target UCI and the second UCI according to the rule of multiplexing the target UCI and the second UCI, the second selection module 1510 is further configured for: determining whether a PUCCH carrying the target UCI and a PUCCH carrying the second UCI satisfy a predetermined time condition; and if the predetermined time condition is satisfied, determining that the target UCI and the second UCI are multiplexed.

Optionally, in the transmission device, when selecting the first UCI with the earliest start symbol among the plurality of first UCIs as the target UCI by the second selection module 1510, and when a preset condition is satisfied, receiving the target UCI and the second UCI according to the rule of multiplexing the target UCI and the second UCI by the second selection module 1510 includes: determining that the second UCI is discarded, or determining that the second UCI and the target UCI are multiplexed on a PUCCH corresponding to the second UCI; wherein the preset condition is at least one of the following: a condition that the second UCI at least includes the CSI, and the target UCI does not have a corresponding PDCCH; a condition that the number of bits of the second UCI is greater than a preset bit quantity, and the target UCI does not have a corresponding PDCCH; a condition that the second UCI is an SR, and the target UCI does not have a corresponding PDCCH; a condition that the second UCI is an HARQ-ACK having a bit quantity less than or equal to a preset bit quantity, and the target UCI does not have a corresponding PDCCH; a condition that the second UCI is the SR, and the PUCCH format 1 is used for transmission of the target UCI; a condition that the second UCI is an HARQ-ACK having a bit quantity less than or equal to a preset bit quantity, and a PUCCH format 1 is used for transmission of the target UCI.

Optionally, in the transmission device, when selecting, among the plurality of first UCIs, the first UCI having the first PUCCH format as the target UCI by the second selection module 1510, before selecting one of the plurality of first UCIs as the target UCI by the second selection module 1510, the second selection module 1510 is further configured for: determining whether a predetermined time condition is satisfied between the plurality of PUCCHs carrying the first UCI and the PUCCH carrying the second UCI; and selecting a first UCI having a first PUCCH format as the target UCI if the predetermined time condition is satisfied.

Optionally, in the transmission device, selecting, among the plurality of first UCIs, the first UCI having the first PUCCH format as the target UCI by the second selection module 1510 includes: when there are at least two first UCIs having the first PUCCH format, selecting, among the first UCIs having the first PUCCH format, a first UCI having an earliest start symbol as the target UCI.

Optionally, in the transmission device, selecting, among the plurality of first UCIs, the first UCI having the first PUCCH format as the target UCI by the second selection module 1510 includes: when there is no first UCI using the first PUCCH format, selecting the target UCI according to one of following, or determining that the second UCI is discarded: 1) selecting a first UCI with an earliest start symbol, among the plurality of first UCIs, as the target UCI; 2) selecting a first UCI having a corresponding PDCCH among the plurality of first UCIs as the target UCI; 3) selecting the first UCI with a second PUCCH format among the plurality of first UCIs as the target UCI; wherein when the first PUCCH format is a PUCCH format 0, the second PUCCH format includes at least one of a PUCCH format 2, a PUCCH format 3, and a PUCCH format 4; when the first PUCCH format is at least one of the PUCCH format 2, the PUCCH format 3, and the PUCCH format 4, the second PUCCH format is the PUCCH format 0.

Optionally, in the transmission device, selecting the first UCI having the second PUCCH format among the plurality of first UCIs as the target UCI by the second selection module 1510 includes at least one of the following: 1) when there are at least two first UCIs using the second PUCCH format, selecting, among first UCIs using the second PUCCH format, a first UCI with the earliest start symbol as the target UCI; 2) when there is no first UCI using the second PUCCH format, selecting the first UCI with the earliest start symbol among the plurality of first UCIs as the target UCI, or selecting, among the plurality of first UCIs, a first UCI having a corresponding PDCCH as the target UCI, or determining that the second UCI is discarded.

Optionally, in the transmission device, selecting, among the plurality of first UCIs, a first UCI having a corresponding PDCCH as the target UCI by the second selection module 1510 includes at least one of the following: 1) when there are at least two first UCIs having corresponding PDCCHs, selecting, among the first UCIs having the corresponding PDCCHs, the first UCI having the earliest start symbol as the target UCI; 2) when there is no first UCI with a corresponding PDCCH, selecting, among the plurality of first UCIs, the first UCI with the earliest start symbol as the target UCI; or determining that the second UCI is discarded.

Optionally, in the transmission device, the first PUCCH format includes at least one of a PUCCH format 2, a PUCCH format 3, and a PUCCH format 4; or, when the second UCI at least includes the CSI, or when the second UCI at least includes the HARQ-ACK, or when the quantity of bits of the second UCI is greater than a preset bit quantity, the first PUCCH format includes at least one of the PUCCH format 2, the PUCCH format 3, and the PUCCH format 4; or, when the second UCI is the SR, or when the quantity of bits of the second UCI is less than or equal to the preset bit quantity, the first PUCCH format includes at least one of the PUCCH format 0, the PUCCH format 2, the PUCCH format 3, and the PUCCH format 4; or, when the second UCI is HARQ-ACK and the quantity of bits of the second UCI is greater than the preset bit quantity, the first PUCCH format includes at least one of the PUCCH format 2, the PUCCH format 3 and the PUCCH format 4; or, when the second UCI is the HARQ-ACK, and the quantity of bits of the second UCI is less than or equal to the preset bit quantity, the first PUCCH format includes at least one of the PUCCH format 0, the PUCCH format 2, the PUCCH format 3, and the PUCCH format 4.

Optionally, in the transmission device, the first UCI includes a Hybrid Automatic Repeat reQuest (HARQ) Acknowledgement (ACK), HARQ-ACK; the second UCI includes at least one of Channel State information (CSI), a Scheduling Request (SR), and a HARQ-ACK.

Optionally, in the transmission device, when the second UCI includes the HARQ-ACK, service types corresponding to the first UCI and the second UCI are different or priority levels of services corresponding to the first UCI and the second UCI are different, or priority levels of the first UCI and the second UCI are different; and/or, when the second UCI includes at least one of the CSI and the SR, service types corresponding to the first UCI and the second UCI are same or different, or priority levels of service types corresponding to the first UCI and the second UCI are same or different, or priority levels of the first UCI and the second UCI are same or different.

Optionally, in the transmission device, the plurality of PUCCHs, carrying the first UCIs, not overlapped in time domain are transmitted in different sub-slots.

Optionally, in the transmission device, receiving the target UCI and the second UCI according to a rule of multiplexing the target UCI and the second UCI by the reception module 1520 includes: determining a target PUCCH for transmitting the target UCI and the second UCI simultaneously; receiving the target UCI and the second UCI on the target PUCCH; wherein the target PUCCH does not overlap in time domain with any one PUCCH carrying a first UCI, other than the target UCI, of the plurality of first UCIs, or the target PUCCH and the PUCCH carrying the target UCI are in the same sub-slot.

In another aspect, an embodiment of the present disclosure also provide a computer-readable storage medium, wherein the computer-readable storage medium has a computer program stored thereon. When the computer program is executed by a processor, the processor implements the steps in the transmission method of the uplink control information (UCI) according to the above.

From the above description, those skilled in the art should be able to understand a specific structure of the computer-readable storage medium for performing the UCI transmission methods described in the present disclosure, and will not be described in detail herein.

In addition, it should be noted that in the devices and methods of the present disclosure, components or steps may be disassembled and/or recombined. Such disassembly and/or recombination should be considered as equivalent solutions of the present disclosure. The steps of executing the above-described series of processes may naturally be executed in a chronological order in the described order, but are not necessarily executed in the chronological order, and some steps may be executed in parallel or independently of each other. It may be understood that all or any steps or components of the methods and the devices of the present disclosure may be implemented in hardware, firmware, software, or combinations thereof in any computing device (including processors, storage media, etc.) or a network of computing devices. This can be accomplished by one of ordinary skills in the art using their basic programming skills after reading the description of the present disclosure.

Accordingly, the objective of the present disclosure may also be achieved by running a program or a set of programs on any computing device. The computing device may be a well-known general-purpose device. Accordingly, the objective of the present disclosure may also be achieved by merely providing a program product containing a program code used for implementing the method or the device. That is, such a program product also constitutes the present disclosure, and a storage medium storing such a program product also constitutes the present disclosure. Obviously, the storage medium may be any known storage medium or any storage medium developed in the future. It should also be noted that in the devices and methods of the present disclosure, components or steps may be disassembled and/or recombined. Such disassembly and/or recombination should be considered as equivalent solutions of the present disclosure. The steps of executing the series of processes described above may be executed in the chronological order naturally in the described order, but are not always necessarily executed in the chronological order. Certain steps may be performed in parallel or independently of each other.

Those of ordinary skills in the art can understand that all or part of the processes in the methods for implementing the above embodiments can be performed by controlling relevant hardware by using a computer program, the program may be stored in a computer-readable storage medium, and when the program is executed, the processes of the embodiments of the methods described above may be implemented. The storage medium may be a magnetic disk, an optical disk, a Read-Only Memory (ROM) or a Random Access Memory (RAM), or the like.

It will be appreciated that the embodiments described by some embodiments of the present disclosure may be implemented in hardware, software, firmware, middleware, microcode, or combinations thereof. In case of being implemented by hardware, modules, units, sub-modules, sub-units, and the like may be implemented in one or more Application Specific Integrated Circuits (ASICs), Digital Signal Processing (DSP), Digital Signal Processing Devices (DSP Device, DSPD), Programmable Logic Devices (PLD), Field-Programmable Gate Array (FPGA), general purpose processors, controllers, microcontrollers, microprocessors, other electronic units for performing the functions described herein, or combinations thereof.

In case of being implemented by software, techniques described in some embodiments of the present disclosure may be implemented by modules (e.g., procedures, functions, etc.) that perform the functions described in some embodiments of the present disclosure. Software codes may be stored in a storage and executed by a processor. The storage may be implemented in the processor or external to the processor.

Accordingly, the objective of the present disclosure may also be achieved by running a program or a set of programs on any computing device. The computing device may be a well-known general-purpose device. Accordingly, the objective of the present disclosure may also be achieved by merely providing a program product containing program code used to implement the method or the device. That is, such a program product also constitutes the present disclosure, and a storage medium storing such a program product also constitutes the present disclosure. Obviously, the storage medium may be any known storage medium or any storage medium developed in the future. It should also be noted that in the devices and methods of the present disclosure, components or steps may be disassembled and/or recombined. Such disassembly and/or recombination should be considered as equivalent solutions of the present disclosure. Also, the steps of executing the series of processes described above may be executed in a chronological order naturally in the described order, but are not always necessarily executed in the chronological order. Certain steps may be performed in parallel or independently of each other.

The foregoing describes optional embodiments of the present disclosure, and it should be noted that several modifications and improvements may be made by those of ordinary skill in the art without departing from the principles set forth in the present disclosure. These modifications and improvements should also be considered to be within the protection scope of the present disclosure.

What is claimed is:

1. A transmission method of Uplink Control Information (UCI) performed by a terminal, comprising:
   selecting one of a plurality of first Hybrid Automatic Repeat reQuest Acknowledgements (HARQ-ACKs) as a target HARQ-ACK, when there are a plurality of transmissions of the first HARQ-ACKs, a plurality of Physical Uplink Control Channels (PUCCH) respectively carrying the first HARQ-ACKs do not overlap in time domain, and all of the plurality of PUCCHs carrying the first HARQ-ACKs overlap with a PUCCH carrying a second UCI in time domain;
   multiplexing the target HARQ-ACK and the second UCI,
   wherein the second UCI is at least one of Channel State information (CSI), HARQ-ACK, or a Scheduling Request (SR),
   wherein, one of the plurality of first HARQ-ACKs is selected as the target HARQ-ACK according to one of following:
   selecting a first HARQ-ACK, with an earliest start symbol, among the plurality of first HARQ-ACKs as the target HARQ-ACK, wherein the plurality of PUCCHs, carrying the first HARQ-ACKs, not overlapped in time domain are transmitted in different sub-slots;
   wherein selecting the first HARQ-ACK, with the earliest start symbol, among the plurality of first HARQ-ACKs as the target HARQ-ACK, the method further comprises:
   when a preset condition is satisfied, multiplexing the target HARQ-ACK and the second UCI in a following way: discarding the second UCI; wherein the preset condition comprises at least one of following:
      the second UCI is Channel State Information (CSI), and the target HARQ-ACK does not have a corresponding Physical Downlink Control Channel (PDCCH); or
      the second UCI is the SR, and the target HARQ-ACK does not have a corresponding PDCCH; or
      the second UCI is the SR, and a PUCCH format 1 is used for transmitting the target HARQ-ACK.

2. A transmission method of uplink control information (UCI) performed by a base station, comprising:
   selecting one of a plurality of first HARQ-ACKs as a target HARQ-ACK, when there are a plurality of transmissions of first HARQ-ACKs, a plurality of Physical Uplink Control Channels (PUCCH) respectively carrying the first HARQ-ACKs do not overlap in time domain, and all of the plurality of PUCCHs carrying the first HARQ-ACKs overlap with a PUCCH carrying a second UCI in time domain;
   receiving the target HARQ-ACK and the second UCI according to a rule of multiplexing the target HARQ-ACK and the second UCI,
   wherein the second UCI is at least one of Channel State information (CSI), HARQ-ACK, or a Scheduling Request (SR),
   wherein one of the plurality of first HARQ-ACKs is selected as the target HARQ-ACK according to following:
   selecting a first HARQ-ACK, with an earliest start symbol, among the plurality of first HARQ-ACKs as the target HARQ-ACK;
   wherein the plurality of PUCCHs, carrying the first HARQ-ACKs, not overlapped in time domain are transmitted in different sub-slots;
   wherein selecting the first HARQ-ACK, with the earliest start symbol, among the plurality of first HARQ-ACKs as the target HARQ-ACK, the method further comprises:
   when a preset condition is satisfied, receiving the target HARQ-ACK and the second UCI according to the rule of multiplexing the target HARQ-ACK and the second UCI in a following way: determining that the second UCI is discarded;
   wherein the preset condition comprises at least one of following:
      the second UCI is Channel State Information (CSI), and the target HARQ-ACK does not have a corresponding Physical Downlink Control Channel (PDCCH); or
      the second UCI is the SR, and the target HARQ-ACK does not have a corresponding PDCCH; or
      the second UCI is the SR, and a PUCCH format 1 is used for transmitting the target HARQ-ACK.

3. A terminal, comprising: a transceiver, a storage, a processor and a program stored on the storage and executable on the processor, wherein the processor is configured, when executing the program, for:

selecting one of a plurality of first Hybrid Automatic Repeat reQuest Acknowledgements (HARQ-ACKs) as a target HARQ-ACK, when there are a plurality of transmissions of first HARQ-ACKs, a plurality of Physical Uplink Control Channels (PUCCH) respectively carrying the first HARQ-ACKS do not overlap in time domain, and all of the plurality of PUCCHs carrying the first HARQ-ACK overlap with a PUCCH carrying a second UCI in time domain;

multiplexing the target HARQ-ACK and the second UCI, wherein the second UCI is at least one of Channel State information (CSI), HARQ-ACK, or a Scheduling Request (SR);

wherein one of the plurality of first HARQ-ACKs is selected by the processor as the target HARQ-ACK according to following:

selecting a first HARQ-ACK, with an earliest start symbol, among the plurality of first HARQ-ACKs as the target HARQ-ACK;

wherein the plurality of PUCCHs, carrying the first HARQ-ACKs, not overlapped in time domain are transmitted in different sub-slots;

wherein selecting the first HARQ-ACK, with the earliest start symbol, among the plurality of first HARQ-ACKs as the target HARQ-ACK, the method further comprises:

when a preset condition is satisfied, multiplexing the target HARQ-ACK and the second UCI in a following way: discarding the second UCI; wherein the preset condition comprises at least one of following:

the second UCI is Channel State Information (CSI), and the target HARQ-ACK does not have a corresponding Physical Downlink Control Channel (PDCCH); or the second UCI is the SR, and the target HARQ-ACK does not have a corresponding PDCCH; or the second UCI is the SR, and a PUCCH format 1 is used for transmitting the target HARQ-ACK.

4. A base station, comprising: a transceiver, a storage, a processor and a program stored on the storage and executable on the processor, wherein the processor is configured, when executing the program, for performing steps of the transmission method of UCI according to claim 2.

\* \* \* \* \*